US011989345B1

(12) United States Patent
Prasad et al.

(10) Patent No.: US 11,989,345 B1
(45) Date of Patent: May 21, 2024

(54) MACHINE LEARNING BASED FORECASTING OF HUMAN GAZE

(71) Applicant: Google LLC, Mountain View, CA (US)

(72) Inventors: Gautam Prasad, Los Angeles, CA (US); Dmitry Lagun, San Jose, CA (US); Florian Schroff, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/548,439

(22) PCT Filed: May 28, 2021

(86) PCT No.: PCT/US2021/034714
§ 371 (c)(1),
(2) Date: Aug. 30, 2023

(87) PCT Pub. No.: WO2022/250683
PCT Pub. Date: Dec. 1, 2022

(51) Int. Cl.
*G06F 3/01* (2006.01)
*G06T 7/70* (2017.01)

(52) U.S. Cl.
CPC .............. *G06F 3/013* (2013.01); *G06T 7/70* (2017.01); *G06T 2207/20081* (2013.01); *G06T 2207/20084* (2013.01); *G06T 2207/30201* (2013.01)

(58) Field of Classification Search
CPC .......... G06F 3/013; G06F 3/011; G06F 3/012; G06F 3/016; G06F 3/0346; G06F 3/14;
(Continued)

(56) References Cited

U.S. PATENT DOCUMENTS 10,871,825 B1 * 12/2020 Sztuk ...................... G06F 3/011
11,238,340 B1 * 2/2022 Anderson ................ G06N 3/02
(Continued)

FOREIGN PATENT DOCUMENTS

EP            3511803           7/2019

OTHER PUBLICATIONS

Bonev et al., "How do you image complexity, task demands and looking biases influence human gaze behavior?" Pattern Recognition Letters, May 1, 2013, pp. 723-730, vol. 34, Issue 7.
(Continued)

*Primary Examiner* — Dong Hui Liang
(74) *Attorney, Agent, or Firm* — McDonnell Boehnen Hulbert & Berghoff LLP

(57) ABSTRACT

A method includes determining a measured eye gaze position of an eye of a user. The method also includes determining a first incremental change in the measured eye gaze position by processing the measured eye gaze position by a long short-term memory (LSTM) model, and determining a first predicted eye gaze position of the eye at a first future time based on the measured eye gaze position and the first incremental change. The method additionally includes determining a second incremental change in the first predicted eye gaze position by processing the first predicted eye gaze position by the LSTM model, and determining a second predicted eye gaze position of the eye at a second future time subsequent to the first future time based on the first predicted eye gaze position and the second incremental change.

20 Claims, 12 Drawing Sheets

(58) Field of Classification Search
CPC ...... G06F 3/017; G06F 30/016; G06F 18/214; G06F 18/251; G06F 18/213; G06F 18/23213; G06F 18/253; G06F 17/18; G06F 16/313; G06F 16/3329; G06F 16/383; G06T 2207/20084; G06T 2207/30041; G06T 19/006
See application file for complete search history.

(56) References Cited

U.S. PATENT DOCUMENTS

2019/0339770 A1* 11/2019 Kurlethimar ........ G02B 27/017
2019/0354173 A1* 11/2019 Young ...................... G06N 3/04

OTHER PUBLICATIONS

Fan et al., "Understanding Human Gaze Communication by Spatio-Temporal Graph Reasoning," Computer Vision Foundation, 2019, pp. 5724-5733.

International Searching Authority, International Search Report and Written Opinion mailed on Dec. 29, 2022, issued in connection with International Patent Application No. PCT/US2021/034714, filed May 28, 2021, 10 pages.

Mirenda et al., "Gaze behavior: A new look at an old problem," Journal of Autism and Developmental Disorders, Dec. 1, 1983, 5 pages (Abstract Only).

Park et al., "Predicting Primary Gaze Behavior using Social Saliency Fields," 2013 IEEE International Conference on Computer Vision, Sydney, NSW, Australia, 2013, pp. 3503-3510.

Syed et al., "Improving Learning Outcomes with Gaze Tracking and Automatic Question Generation," WWW '20: Proceedings of The Web Conference 2020, Apr. 2020, pp. 1693-1703.

Yohandy et al., "Considered Factors of Online News Based on Respondents' Eye Activity Using Eye-Tracker Anaylsis," Future Internet, 2020, 37 pages, vol. 12, No. 57.

Yun et al., "Studying Relationships Between Human Gaze, Description, and Computer Vision," 2013 IEEE Conference on Computer Vision and Pattern Recognition, 2013, 8 pages.

Zaraki et al., "Designing and Evaluating a Social Gaze-Control System for a Humanoid Robot," IEEE Transactions on Human-Machine Systems, Apr. 2014, pp. 157-168, vol. 44, No. 2 (Abstract Only).

Ziv, Gal, "Gaze Behavior and Visual Attention: A Review of Eye Tracking Studies in Aviation," The International Journal of Aviation Psychology, 2016, 5 pages, vol. 26, Issue 3-4 (Abstract Only).

* cited by examiner

MACHINE LEARNING BASED FORECASTING OF HUMAN GAZE

CROSS-REFERENCE TO RELATED APPLICATIONS

The present application is a National Stage Application under 35 U.S.C. § 371 and claims priority to International Patent Application No. PCT/US2021/034714, filed May 28, 2021, and titled "Machine Learning Based Forecasting of Human Gaze," which is incorporated herein by reference in its entirety.

BACKGROUND

Eye gaze detection may involve determining a direction in which a person is looking based on, for example, images of one or both of the person's eyes. The eye gaze may be based on a pose of the eye relative to the person's head, as well as a pose of the head relative to a world reference frame. A pattern of the person's eye gaze may depend on a subject being observed by the person, as well as a task being performed with respect to the subject. For example, reading text may involve a different eye gaze pattern than observing a scene in an environment, while observing the scene for the purpose of driving a car may involve a different eye gaze pattern than observing the scene for the purpose of identifying therein a particular person.

SUMMARY

A long short term-memory (LSTM) neural network model may be configured to generate predicted eye gaze positions of an eye of a user. Specifically, a plurality of measured eye gaze positions may be processed by the LSTM model as part of a warm-up phase that develops and updates a hidden state of the model, thus priming the LSTM model for the specific context in which it is to generate predictions. Following the warm-up phase, the LSTM model may be used to generate a plurality of predicted eye gaze positions as part of an inference phase where each predicted eye gaze position is generated by processing, by the LSTM model, a prior predicted eye gaze position generated by the LSTM model. The warm-up phase, which may involve processing of a predetermined number of measured eye gaze positions, may be periodically alternated with the inference phase, which may involve generation of a particular number of predicted eye gaze positions, thus allowing the LSTM model to periodically recalibrate to what the user is actually looking at. For each respective predicted eye gaze position, the LSTM model may be configured to generate a corresponding incremental change from a preceding predicted eye gaze position. Thus, the corresponding incremental change may be added to the preceding predicted eye gaze position to obtain the respective predicted eye gaze position.

In a first example embodiment, a method includes determining, based on an image representing an eye of a user, a measured eye gaze position of the eye. The method also includes determining a first incremental change in the measured eye gaze position by processing the measured eye gaze position by a long short-term memory (LSTM) model that has been trained to generate incremental changes in eye gaze positions, and determining a first predicted eye gaze position of the eye at a first future time based on the measured eye gaze position and the first incremental change in the measured eye gaze position. The method additionally includes determining a second incremental change in the first predicted eye gaze position by processing the first predicted eye gaze position by the LSTM model, and determining a second predicted eye gaze position of the eye at a second future time subsequent to the first future time based on the first predicted eye gaze position and the second incremental change in the first predicted eye gaze position. The method further includes outputting one or more of: the first predicted eye gaze position or the second predicted eye gaze position.

In a second example embodiment, a system includes a processor and a non-transitory computer-readable medium having stored thereon instructions that, when executed by the processor, cause the processor to perform operations. The operations include determining, based on an image representing an eye of a user, a measured eye gaze position of the eye. The operations also include determining a first incremental change in the measured eye gaze position by processing the measured eye gaze position by an LSTM model that has been trained to generate incremental changes in eye gaze positions, and determining a first predicted eye gaze position of the eye at a first future time based on the measured eye gaze position and the first incremental change in the measured eye gaze position. The operations additionally include determining a second incremental change in the first predicted eye gaze position by processing the first predicted eye gaze position by the LSTM model, and determining a second predicted eye gaze position of the eye at a second future time subsequent to the first future time based on the first predicted eye gaze position and the second incremental change in the first predicted eye gaze position. The operations further include outputting one or more of: the first predicted eye gaze position or the second predicted eye gaze position.

In a third example embodiment, a non-transitory computer-readable medium may have stored thereon instructions that, when executed by a computing device, cause the computing device to perform operations. The operations include determining, based on an image representing an eye of a user, a measured eye gaze position of the eye. The operations also include determining a first incremental change in the measured eye gaze position by processing the measured eye gaze position by an LSTM model that has been trained to generate incremental changes in eye gaze positions, and determining a first predicted eye gaze position of the eye at a first future time based on the measured eye gaze position and the first incremental change in the measured eye gaze position. The operations additionally include determining a second incremental change in the first predicted eye gaze position by processing the first predicted eye gaze position by the LSTM model, and determining a second predicted eye gaze position of the eye at a second future time subsequent to the first future time based on the first predicted eye gaze position and the second incremental change in the first predicted eye gaze position. The operations further include outputting one or more of: the first predicted eye gaze position or the second predicted eye gaze position.

In a fourth example embodiment, a system includes means for determining, based on an image representing an eye of a user, a measured eye gaze position of the eye. The system also includes means for determining a first incremental change in the measured eye gaze position by processing the measured eye gaze position by an LSTM model that has been trained to generate incremental changes in eye gaze positions, and means for determining a first predicted eye gaze position of the eye at a first future time based on the measured eye gaze position and the first incremental change in the measured eye gaze position. The system additionally includes means for determining a second incremental change in the first predicted eye gaze position by processing the first predicted eye gaze position by the LSTM model, and determining a second predicted eye gaze position of the eye at a second future time subsequent to the first future time based on the first predicted eye gaze position and the second incremental change in the first predicted eye gaze position. The system further includes means for outputting one or more of: the first predicted eye gaze position or the second predicted eye gaze position.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
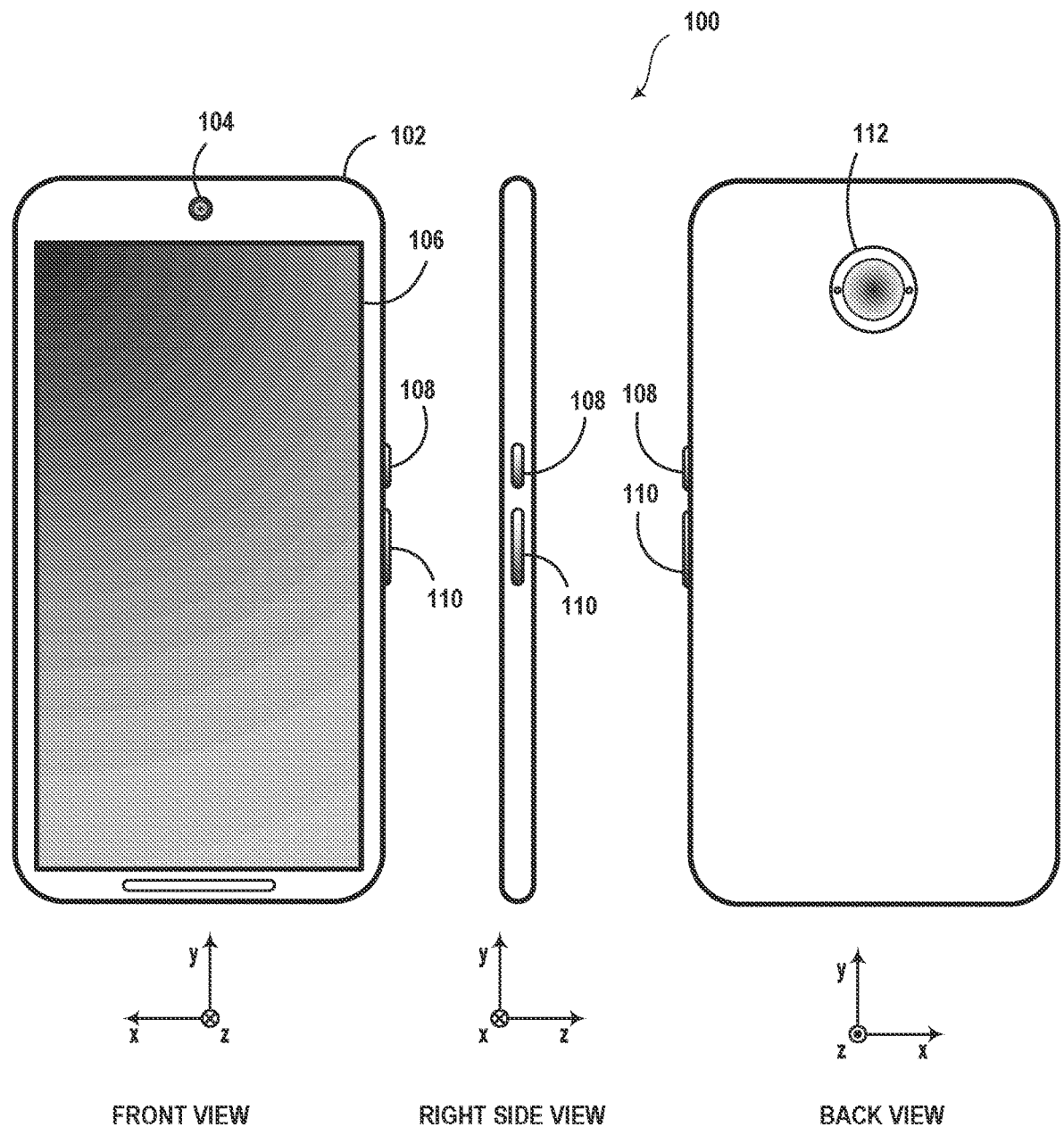
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

Determining a user's intents, such as the user's expected future actions and/or desired results thereof, may allow a device and/or application to perform operations in anticipation of the user's future actions, thereby improving the user's experience with the device and/or application. Specifically, such anticipatory performance of operations may reduce the appearance of latency in response to user inputs and/or reduce a number of inputs the user provides to obtain a desired result. One way in which the user's intents may be determined involves monitoring a position of an eye gaze of one or both of the user's eyes. Specifically, a measured eye gaze position may indicate where the user is currently looking with respect to the device and/or application, and thus provide cues as to the user's current intents.

Reliance on the measured eye gaze position to determine user intent may, however, be deficient for several reasons. First, the measured eye gaze may be determined by, for example, processing image data representing the user's eyes, resulting in a delay between capture of the image data and determination of the measured eye gaze. Thus, the measured eye gaze may lag behind the most recent image data, and thus behind the user's most recent intents. Second, some devices may, due to processing and/or energy constraints, be incapable of processing the image data at a sufficiently high frame rate, resulting in relatively sparse measured eye gaze positions and greater processing delays following image data capture. For example, image data may be generated at 30 frames per second, but the device might be able to generate measured eye gaze positions at no more than, for example, 5 frames per second. Third, some devices might not include camera hardware capable of generating image data at a sufficiently high frame rate, thus also resulting in relatively sparse eye gaze positions.

Accordingly, provided herein are techniques, systems, and/or operations for using measured eye gaze positions to generate predicted eye gaze positions, at least some of which may represent the user's intents at corresponding future times. Each predicted eye gaze position may take less computational effort (and thus less time) to determine than a corresponding measured eye gaze position, thereby reducing delay in the response to the user's intents and allowing for implementation on devices with relatively low processing capabilities. Thus, the predicted eye gaze positions may allow various devices and/or applications to respond to the user's intents at or before a time at which these intents might actually be determinable based on captured image data. The devices and/or applications may be caused to perform an operation based upon the predicted eye gaze. The predicted eye gaze may therefore provide an input to the devices and/or applications and may be used to control the devices and/or applications.

In example embodiments, the predicted eye gaze positions may be determined by an LSTM model. The LSTM model may be adapted to generate predictions for a particular context by way of a warm-up phase in which the LSTM model develops its hidden state by processing a plurality of measured eye gaze positions. For example, the LSTM model may be primed to generate predicted eye gaze positions in connection with a user reading text on a user interface (UI) by processing a plurality of measured eye gaze positions representing the user's eye gaze patterns in connection with reading the text. In another example, the LSTM model may be primed to generate predicted eye gaze positions in connection with a user looking at photos on the UI by processing a plurality of measured eye gaze positions representing the user's eye gaze patterns in connection with looking at the photos. Since the purpose of the warm-up phase is to develop a hidden state of the LSTM model for a particular context, all but the last prediction generated by the LSTM model as part of the warm-up phase may be discarded.

After the warm-up phase, the LSTM model may be used to generate predicted eye gaze positions as part of an inference phase. Specifically, the LSTM model may be configured to generate, based on a given eye gaze position, an incremental change in the given eye gaze position. The LSTM model may also be configured to add this incremental change to the given eye gaze position and thereby determine a corresponding predicted eye gaze position subsequent to the given eye gaze position. The first predicted eye gaze position generated as part of the inference phase may be based on the last predicted eye gaze position generated as part of the warm-up phase. The LSTM model may then process the first predicted eye gaze position, as described above, to generate a further predicted eye gaze position. By chaining a plurality of predicted eye gaze positions in this way, the LSTM model may be configured to generate an arbitrary number of predicted eye gaze positions.

The warm-up and inference phases may be periodically alternated and repeated, with additional warm-up phases allowing the LSTM model to continue to adapt to changes in the user's usage of the device and/or application. For example, the warm-up phase may involve processing 100 measured eye gaze positions and the inference phase may involve generating 1,700 predicted eye gaze positions. The eye gaze positions may be represented as three-dimensional vectors and/or as two-dimensional UI positions, among other possibilities. The eye gaze positions may be normalized, such that the same LSTM model may be used for various devices and/or applications, regardless of, for example, a resolution of a given UI. For example, vectors representing the eye gaze position may be normalized to have a predetermined length (e.g., unit length), and UI coordinates representing the eye gaze positions may be normalized to have a predetermined width and height.

In some implementations, the LSTM model may be used in combination with semantic annotations of a subject with which the user is interacting. The subject may be, for example, a UI, a robotic device, or a home automation device, among other possibilities. Maps of different regions of these subjects may be annotated with semantic information that is indicative of a role of each region in the context of the user interaction, and may thus be indicative of a likelihood of the user looking at a given region. For example, different UI components of the UI may be labeled with the content and/or functions provided by these components. In another example, different components of a robot may be labeled with the functions and/or extent of user interactivity provided by these components.

In some implementations, predicted eye gaze positions generated by the LSTM model may be adjusted based on semantic maps of the subject. In other implementations, the LSTM may be configured to receive the semantic maps as input, and thus explicitly generate semantically-aware predicted eye gaze positions that may be more accurate due to the additional information. For example, in the absence of semantic information, the LSTM model may generate a predicted eye gaze position that corresponds to a background portion of the UI. The semantic information may be used to adjust this predicted eye gaze position to coincide with a nearby UI component with which the user is more likely to interact. In another example, in the absence of semantic information, the LSTM model may generate a predicted eye gaze position that corresponds to a non-interactive part of a robotic device (e.g., a linkage of the robot). The semantic information may be used to adjust this predicted eye gaze position to coincide with a nearby robot part that is interactive (e.g., a gripper connected to the linkage).

II. EXAMPLE COMPUTING DEVICES AND SYSTEMS

FIG. 1 illustrates an example computing device 100. Computing device 100 is shown in the form factor of a mobile phone. However, computing device 100 may be alternatively implemented as a laptop computer, a tablet computer, and/or a wearable computing device, among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of one or more aspects of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic, stereoscopic, or multiscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

Figure 2:
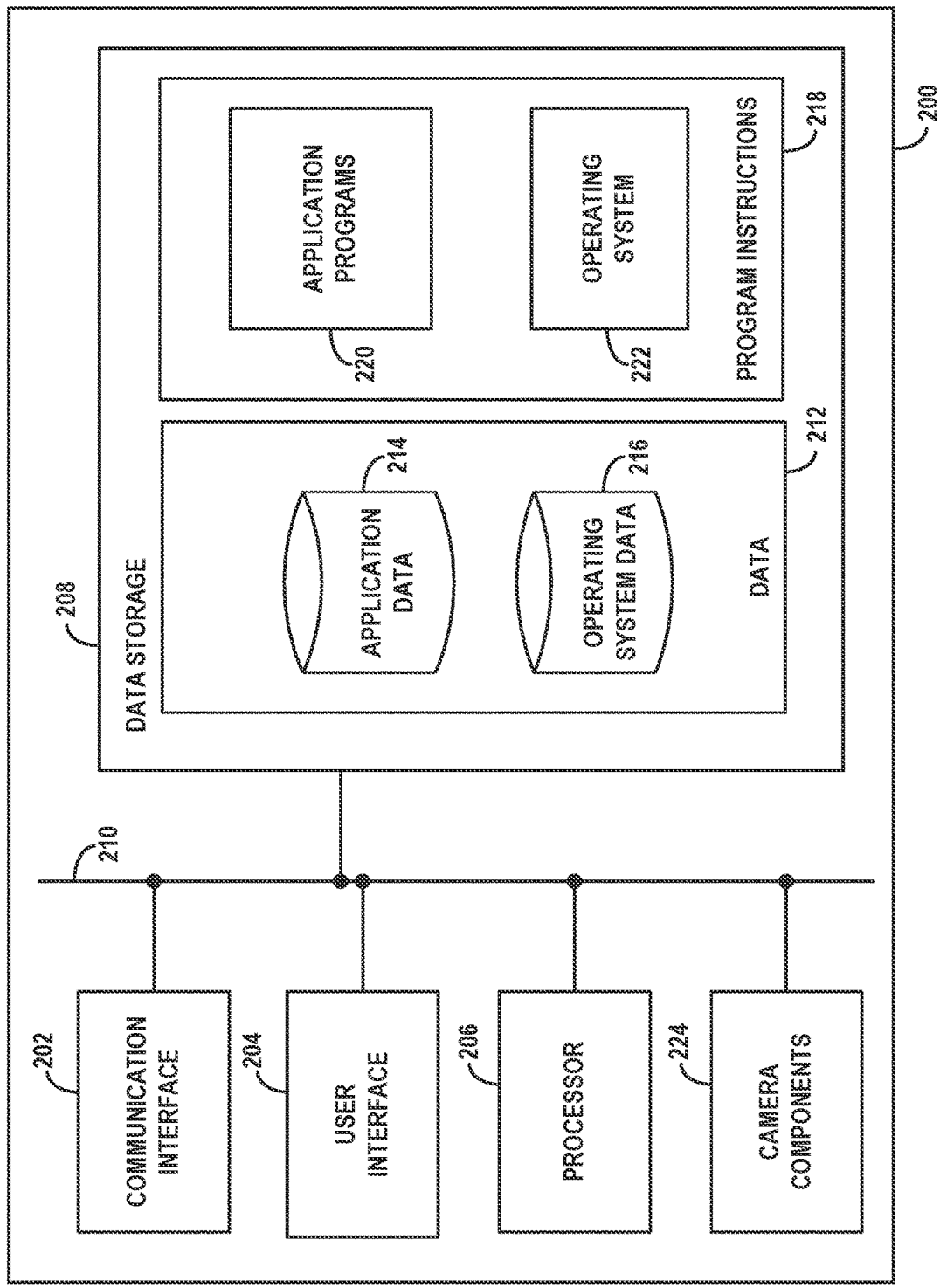
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and/or processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen, which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and/or components configured for capturing of images in the infrared light spectrum (e.g., electromagnetic radiation having a wavelength of 701 nanometers-1 millimeter), among other possibilities. Camera components 224 may be controlled at least in part by software executed by processor 206.

III. EXAMPLE LSTM MODEL FOR EYE GAZE POSITION PREDICTION

Figure 3A:
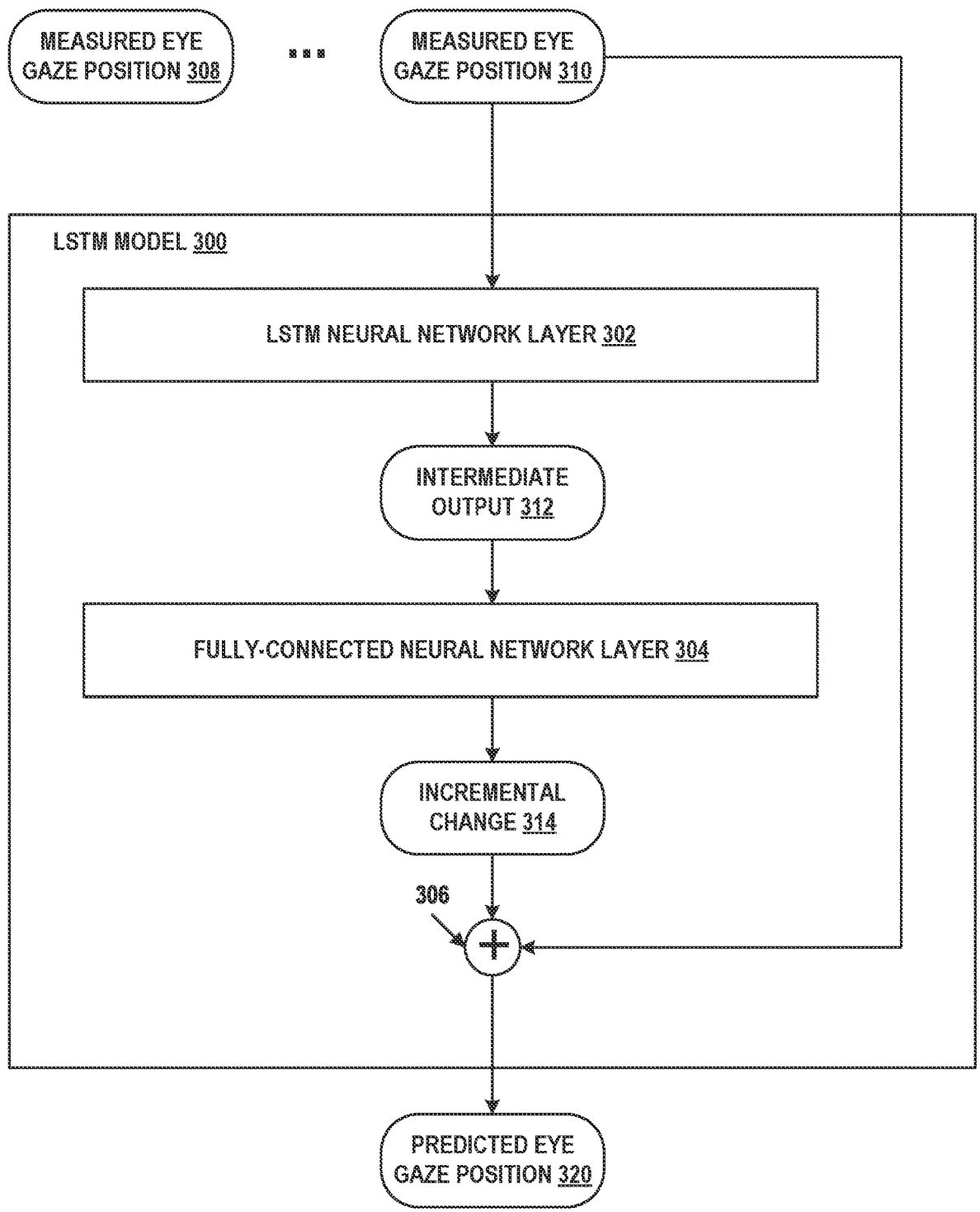
FIGS. 3A, 3B, and 3C illustrate aspects of an LSTM model for predicting eye gaze positions, in accordance with examples described herein.
Figure 3B:
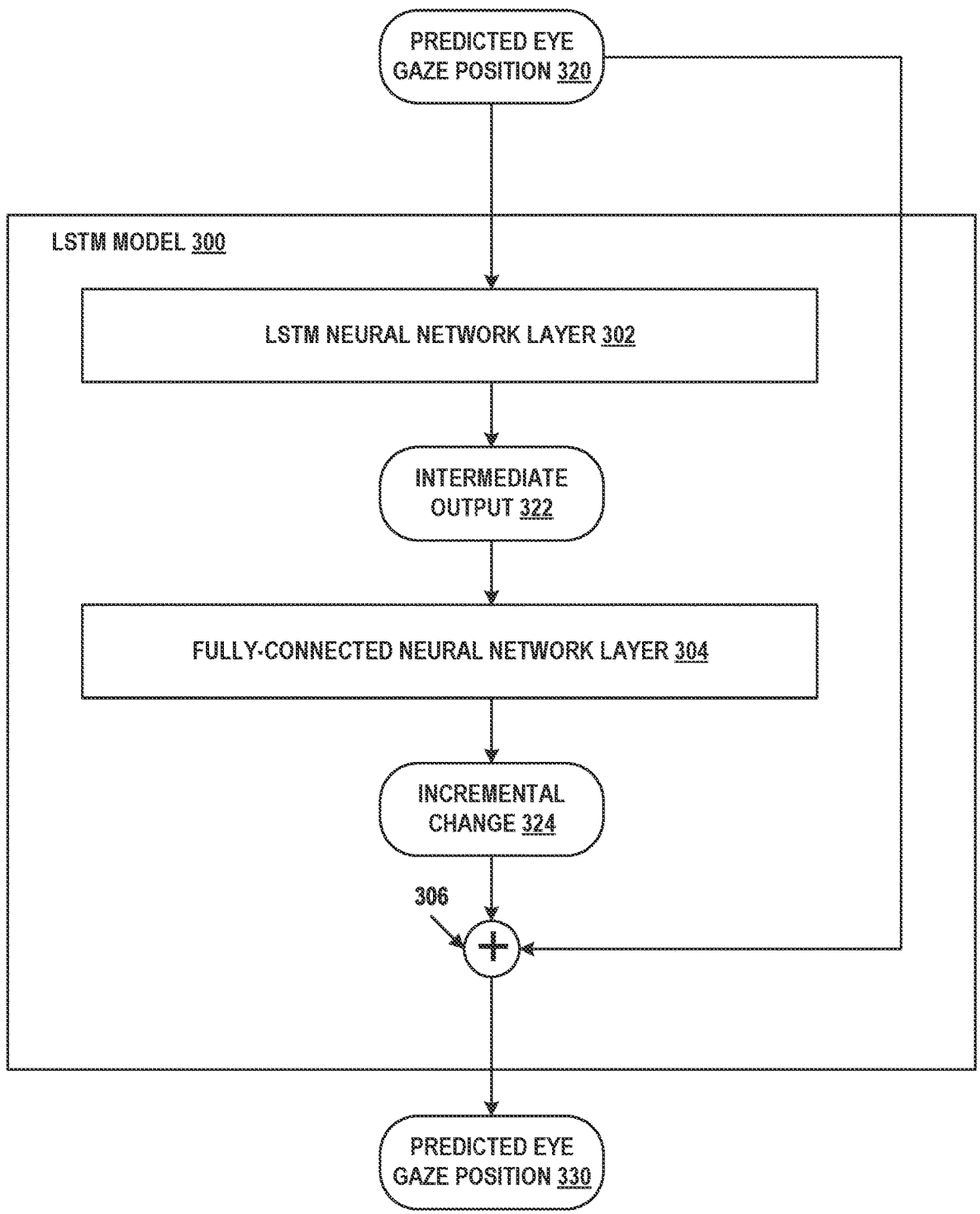
Figure 3C:
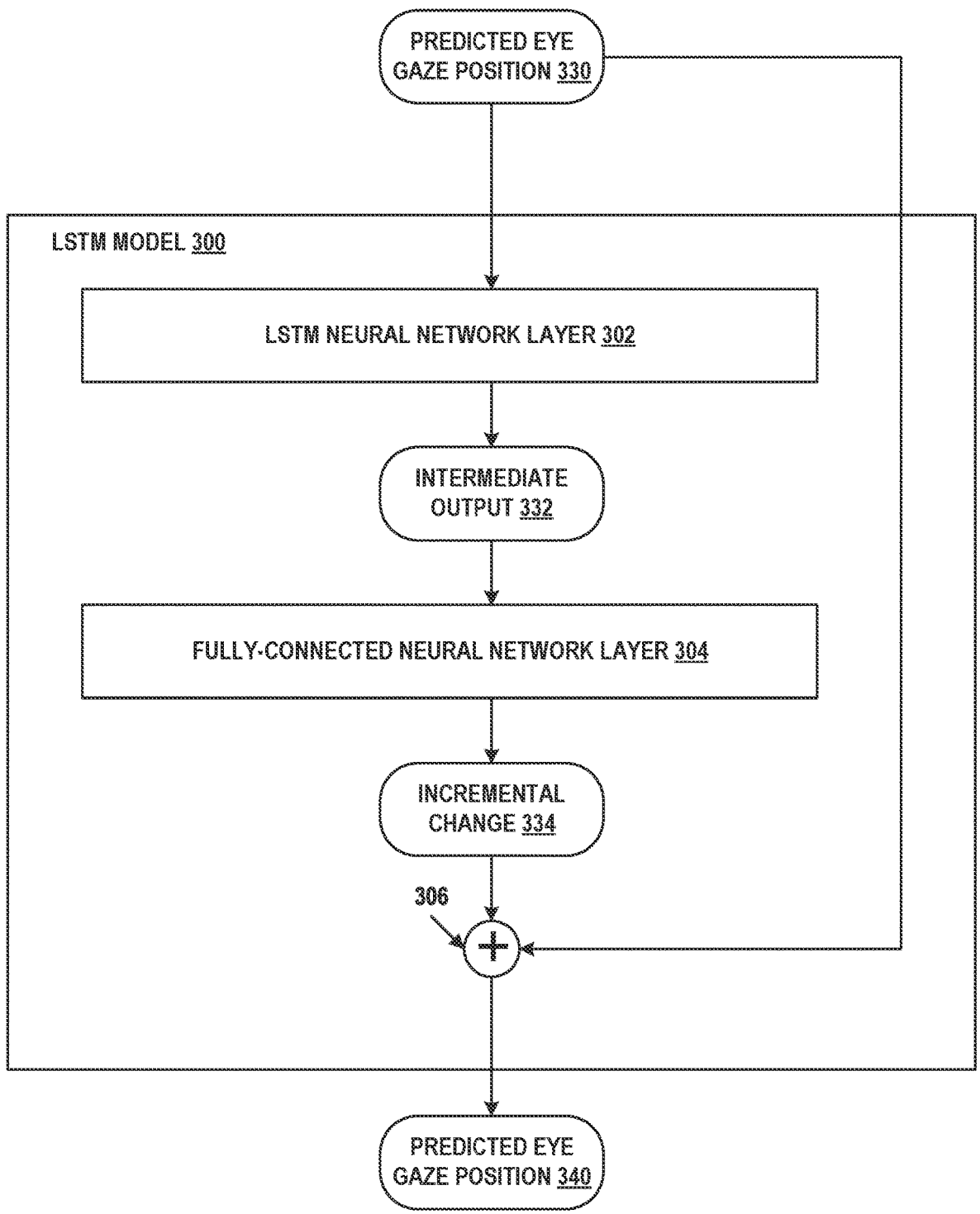

FIGS. 3A, 3B, and 3C illustrate aspects of an LSTM model that may be used to predict future eye gaze positions of an eye of a user. Specifically, LSTM model 300 may include LSTM neural network layer 302, fully-connected neural network layer 304, and adder 306, among other components. LSTM 300 may be implemented as hardware, software, or a combination thereof. LSTM model 300 may be primed to operate in a particular context using a plurality of measured eye gaze positions, as shown in FIG. 3A, and may subsequently generate a plurality of predicted eye gaze positions for the particular context, as shown in FIGS. 3A, 3B, and 3C.

Turning to FIG. 3A, LSTM model 300 may be configured to process each of a plurality of measured eye gaze positions, illustrated in FIG. 3A as measured eye gaze positions 308 through 310 (i.e., measured eye gaze positions 308-310 include two or more measured eye gaze positions), as part of a warm-up phase configured to develop a hidden state of LSTM neural network layer 302. Measured eye gaze positions 308-310 may be based on images representing at least one eye of a user (for example images of the user's face or part of the user's face that represent the at least one eye of the user). Developing the hidden state of LSTM neural network layer 302 based on measured eye gaze position 308-310 may allow LSTM model 300 to determine a context in which it is being used, and thus generate predicted eye gaze positions that are specific to that context, rather than to other possible contexts.

For example, LSTM model 300 may have been trained to predict eye gaze positions in a plurality of contexts, such as when the user is reading text on a screen, looking at a series of images on the screen, watching a video on the screen, interacting with a robotic device, and/or interacting with a home automation device, among other possibilities. Measured eye gaze positions 308-310 may include an eye gaze position pattern indicative of one or more of these contexts. Thus, when measured eye gaze positions 308-310 are processed by LSTM model 300 as part of the warm-up phase, LSTM model 300 may be able to identify the eye gaze position pattern and generate predicted eye gaze positions that follow this pattern.

Specifically, measured eye gaze position 310 may be processed by LSTM neural network layer 302 to generate intermediate output 312. Intermediate output 312 may be processed by fully-connected neural network layer 304 to generate incremental change 314. Incremental change 314 may be added, by adder 306, to measured eye gaze position 310, thus generating predicted eye gaze position 320. Prior to processing of measured eye gaze position 310, other measured eye gaze positions of eye gaze positions 308-310 may be similarly processed by LSTM model 300, with each processing causing a corresponding update to the hidden state of LSTM neural network layer 302. Such processing may be carried out sequentially according to the temporal order (e.g., as represented by corresponding time stamps) of measured eye gaze positions 308-310.

Aside from predicted eye gaze position 320, other predicted eye gaze positions generated based on measured eye gaze positions 308-310 may be discarded, since these other predicted eye gaze positions might not be sufficiently accurate until LSTM model 300 has been primed with (and LSTM neural network layer 302 has thus had its hidden state updated based on) at least a threshold number of measured eye gaze positions. Predicted eye gaze position 320, which is based on measured eye gaze position 310, may be considered to be a valid prediction (and thus might not be discarded) due to LSTM model 300 having been sufficiently primed by measured eye gaze positions that precede measured eye gaze position 310.

Turning to FIG. 3B, predicted eye gaze position 320 may be provided as input to LSTM model 300 to generate predicted eye gaze position 330. Specifically, predicted eye gaze position 320 may be processed by LSTM neural network layer 302 to generate intermediate output 322, which may in turn be processed by fully-connected neural network layer 304 to generate incremental change 324. Incremental change 324 may be added, by adder 306, to predicted eye gaze position 320 to generate predicted eye gaze position 330. Predicted eye gaze position 330 may be similarly processed by LSTM model 300 to generate a further predicted position.

Accordingly, turning to FIG. 3C, predicted eye gaze position 330 may be provided as input to LSTM model 300 to generate predicted eye gaze position 340. Specifically, predicted eye gaze position 330 may be processed by LSTM neural network layer 302 to generate intermediate output 332, which may in turn be processed by fully-connected neural network layer 304 to generate incremental change 334. Incremental change 334 may be added, by adder 306, to predicted eye gaze position 330 to generate predicted eye gaze position 340. Predicted eye gaze position 340 may be similarly processed by LSTM model 300 to generate a yet further predicted position.

Such processing of a current predicted eye gaze position to generate a subsequent predicted eye gaze position may be repeated a predetermined number of times. In some implementations, the predetermined number of times may be selected to maintain an accuracy of the predicted eye gaze positions above a threshold autoregression accuracy value (and thus below a corresponding threshold autoregression error). After LSTM model 300 determines the predetermined number of predicted eye gaze positions, LSTM model 300 may again be warmed-up, or primed, to a new context using another set of measured eye gaze positions, as discussed with respect to FIG. 3A. A predicted eye gaze position based on a last measured position of this other set of measured eye gaze positions may represent the first of another series of predicted eye gaze positions, as discussed with respect to FIGS. 3B and 3C. LSTM model 300 may thus be periodically re-primed as part of a warm-up phase in order to maintain an accuracy of the predicted eye gaze positions above the threshold autoregression accuracy value.

Intermediate outputs (e.g., 312, 322, and 332) generated by LSTM neural network layer 302 may represent a hidden state output by LSTM neural network layer 302. A dimension of this hidden state (e.g., a number of values in a vector representing the hidden state) may be greater than a dimension used to represent the eye gaze positions. For example, the dimension of the hidden state may be selected to provide LSTM neural network layer 302 with sufficient representational capacity to carry out the eye gaze position prediction task. Accordingly, fully-connected neural network layer 304 may be configured to transform the incremental outputs to incremental changes (e.g., 314, 324, 334) that have a dimension which matches the physical dimension of the eye gaze positions. For example, fully-connected neural network layer 304 may be configured to reduce a 100-dimensional intermediate output to a three-dimensional incremental change.

LSTM model 300 may be considered to be autoregressive in that it is configured to use a predicted eye gaze position (e.g., 330) to generate a subsequent predicted eye gaze position (e.g., 340). LSTM model 300 may be considered residual in that it is configured to generate an incremental change (e.g., 334) that is added to a preceding eye gaze position (e.g., 330) in order to determine a subsequent predicted eye gaze position (e.g., 340), rather than generating the subsequent predicted eye gaze position directly. Such a residual formulation of the gaze position prediction task may constitute a form of normalization that allows LSTM model 300 to operate more efficiently (e.g., make predictions faster and/or use fewer model parameters) and/or be trained faster than a non-residual model.

The predicted eye gaze positions generated by LSTM model 300 may be used to anticipatorily trigger execution of software instructions. Specifically, based on and/or in response to a predicted eye gaze position having a predetermined value, execution of a particular set of software instructions may be triggered. The particular set of instructions may be executed before or at a time when the user's actual eye gaze is expected to be at the predicted eye gaze position, thus creating a user experience that may feel more responsive and/or interactive to the user. The operations carried out by the particular set of instructions may vary according to the context in which the predicted eye gaze positions are used. The predicted eye gaze positions may therefore provide input to a user interface to provide user interaction with the user interface.

For example, content or a layout of a UI provided by a computing device may be changed in response to the predicted eye gaze position indicating that a user is expected to look at a particular area and/or component of the UI. In another example, a robotic device, a wireless speaker device, and/or a home automation device may execute one or more operations in response to the user being predicted to look in the direction of the device. For example, the robotic device might look at the user, the wireless speaker may lower its volume to more clearly hear the user, and/or the home automation device may exit sleep mode in preparation to receive a user command, among other possibilities. The techniques described herein may be used in other contexts that involve some dependence on eye gaze position, such as vehicle driver attention monitoring, among other possibilities.

IV. EXAMPLE EYE GAZE POSITION REPRESENTATIONS

Figure 4A:
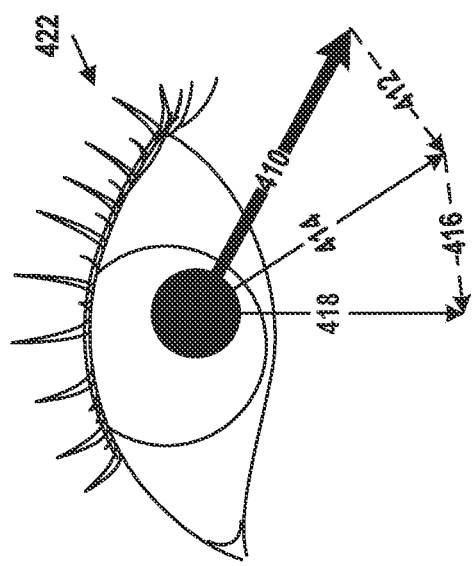
FIG. 4A illustrates eye gaze vectors, in accordance with examples described herein.
Figure 4A:
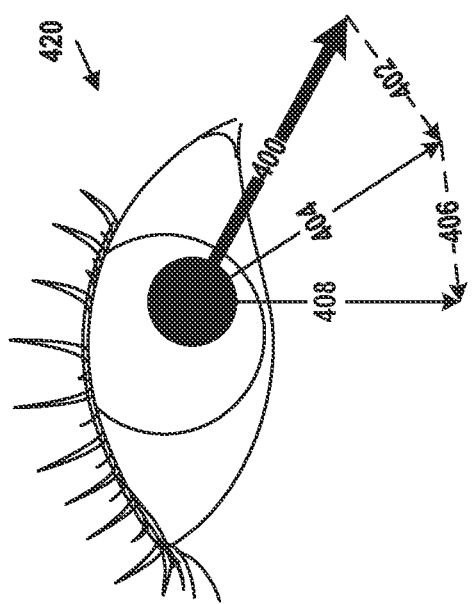
Figure 4B:
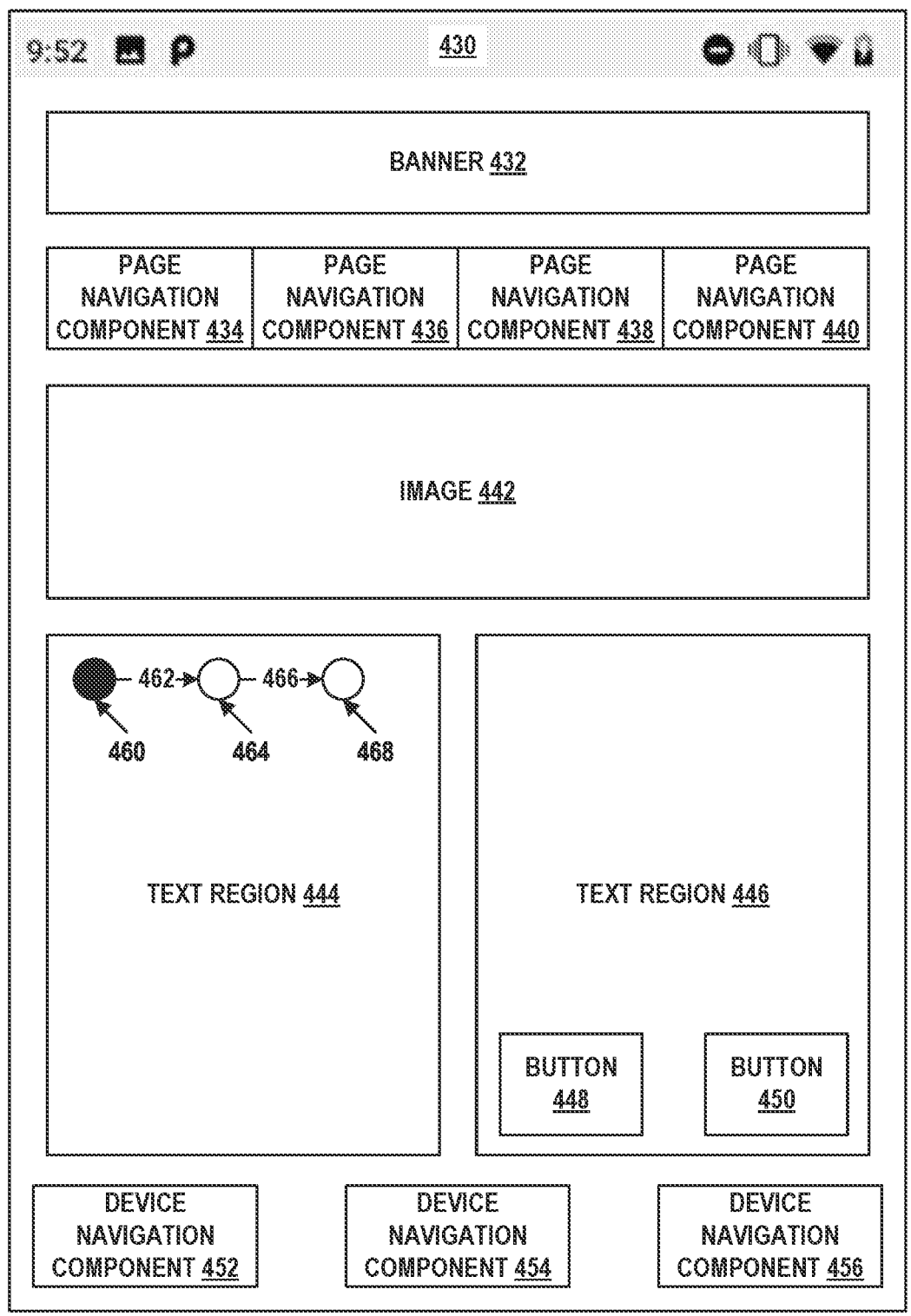
FIG. 4B illustrates eye gaze positions on a user interface, in accordance with examples described herein.

FIGS. 4A and 4B illustrate example representations of eye gaze positions and corresponding incremental changes that may be used by LSTM model 300. Specifically, FIG. 4A shows the eye gaze positions represented as three-dimensional eye gaze vectors, while FIG. 4B shows the eye gaze positions represented as two-dimensional UI coordinates. In applications that involve one or more user interfaces, one or both of the representation of FIG. 4A or the representation of FIG. 4B may be used to represent eye gaze positions. Additionally, the representation of FIG. 4A may be converted into the representation of FIG. 4B by projecting the three-dimensional eye gaze vector into a reference frame of a UI. The representation of FIG. 4A may also be used in applications that do not involve a two-dimensional UI, such as applications that involve interacting with a robotic device, a home automation device, and/or a wireless speaker, among other possibilities.

FIG. 4A illustrates two eyes, eye 420 and eye 422, of a user. A current eye gaze position of eye 420 is represented by eye gaze vector 400, while a current eye gaze position of eye 422 is represented by eye gaze vector 410. Eye gaze vector 400 may represent, for example, measured eye gaze position 310. Similarly, eye gaze vector 410 may represent a last measured eye gaze position of a plurality of measured eye gaze positions of eye 422. Other measured eye gaze positions (e.g., 308) may also be represented as eye gaze vectors (not shown).

Each of eye gaze vectors 400 and 410, as well as eye gaze vectors provided as input to and generated as output by LSTM model 300, may be normalized to have a predetermined length, such as unit length. Specifically, information about where eyes 420 and 422 are looking may be encoded in the directions represented by vectors 400 and 410, respectively, and so the magnitudes thereof might not be used and/or useful. By normalizing eye gaze vectors to have, for example, a unit length, the range of inputs and outputs of LSTM model 300 may be bounded, thus facilitating training of LSTM model 300 and allowing LSTM model 300 to focus on learning to predict eye gaze direction, rather than magnitude (which might not include used and/or useful information).

The incremental change in eye gaze vector 400 may be represented by incremental change vector 402, while the incremental change in eye gaze vector 410 may be represented by incremental change vector 412. Incremental change vector 402 may represent, for example, incremental change 314. Incremental change vector 402 may be added to eye gaze vector 400 to determine eye gaze vector 404. Similarly, incremental change vector 412 may be added to eye gaze vector 410 to determine eye gaze vector 414. Eye gaze vector 404 may represent, for example, predicted eye gaze position 320. Similarly, eye gaze vector 414 may represent a predicted eye gaze position of eye 422 determined based on the last measured eye gaze position of eye 422.

The incremental change in eye gaze vector 404 may be represented by incremental change vector 406, while the incremental change in eye gaze vector 414 may be represented by incremental change vector 416. Incremental change vector 406 may represent, for example, incremental change 324. Incremental change vector 406 may be added to eye gaze vector 404 to determine eye gaze vector 408. Similarly, incremental change vector 416 may be added to eye gaze vector 414 to determine eye gaze vector 418. Eye gaze vector 408 may represent, for example, predicted eye gaze position 330.

In implementations where eye gaze vectors 400 and 410 are scaled to have, for example, a unit length, LSTM model 300 may be configured to generate incremental change vectors 402 and 412 that, after being added to eye gaze vectors 400 and 410, respectively, change the respective directions thereof while preserving the unit length thereof. That is, LSTM model 300 may be configured to generate eye gaze vectors 404 and 414 that have a unit length. Similarly, incremental change vectors 406 and 416 may be determined such that, after being added to eye gaze vectors 404 and 414, respectively, change the respective directions thereof while preserving the unit length thereof, resulting in eye gaze vectors 408 and 418 having a unit length.

FIG. 4B illustrates user interface (UI) 430 that includes a plurality of different UI components. Specifically, UI 430 includes banner 432, page navigation components 434, 436, 438, and 440, image 442, text regions 444 and 446, buttons 448 and 450, and device navigation components 452, 454, and 456. A current eye gaze position of one or more eyes (e.g., eye 420) is represented by UI coordinates 460, which correspond to an upper left portion of text region 444. UI coordinates 460 may represent, for example, measured eye gaze position 310.

In some implementations, UI coordinates may simultaneously represent an eye gaze position of both eyes of the user, since both eyes may generally focus on the same portion of UI 430. Accordingly, in one implementation, left eye UI coordinates generated by a first instance of LSTM model 300 may be combined (e.g., averaged) with corresponding right eye UI coordinates generated by a second instance of LSTM model 300 to generate combined UI coordinates representing a combined gaze position of both eyes. In another implementation, LSTM model 300 may be configured to directly generate the combined UI coordinates representing the combined gaze position of both eyes, for example, based on each of measured eye gaze positions 308-310 also representing combined measured UI coordinates.

The incremental change in UI coordinates 460 may be represented by incremental UI coordinates change 462. Incremental UI coordinates change 462 may represent, for example, incremental change 314. Incremental UI coordinates change 462 may be added to UI coordinates 460 to determine UI coordinates 464. UI coordinates 464 may represent, for example, predicted eye gaze position 320. Further, the incremental change in UI coordinates 462 may be represented by incremental UI coordinates change 466. Incremental UI coordinates change 466 may represent, for example, incremental change 324. Incremental UI coordinates change 466 may be added to UI coordinates 464 to determine UI coordinates 468. UI coordinates 468 may represent, for example, predicted eye gaze position 330.

LSTM model 300 may be configured to determine incremental UI coordinate changes that maintain the resulting UI coordinates within an area of UI 430. For example, each of incremental UI coordinates changes 462 and 466 may be determined such that, when added to UI coordinates 460 and 464, respectively, generate UI coordinates 464 and 468, respectively, that fall within an area of UI 430, rather than outside of the area thereof. That is, LSTM model 300 may be configured to predict eye gaze positions indicative of continued user engagement with the corresponding UI, rather than user disengagement from the corresponding UI (as might be indicated via UI coordinates falling outside of this UI).

In some implementations, the UI coordinates may be represented as values within a predetermined range. For example, horizontal positions along UI 430 may be scaled to a range of 0.0 to 1.0, with 0.0 representing leftmost pixels of UI 430, 1.0 representing rightmost pixels of UI 430, and decimal values therebetween representing pixels therebetween (e.g., 0.5 representing middle pixels along the horizontal direction of UI 430). Vertical positions along UI 430 may be similarly scaled to the range of, for example, 0.0 to 1.0, with 0.0 representing topmost pixels of UI 430, 1.0 representing bottommost pixels of UI 430, and decimal values therebetween representing pixels therebetween. Such scaling may allow LSTM model 300 to be used to predict eye gaze positions for various UIs having different resolutions and/or sizes, since these various resolutions and/or sizes may be scaled to a common range before processing by LSTM model 300.

V. EXAMPLE SEMANTIC-BASED EYE GAZE POSITION ADJUSTMENTS

Figure 5:
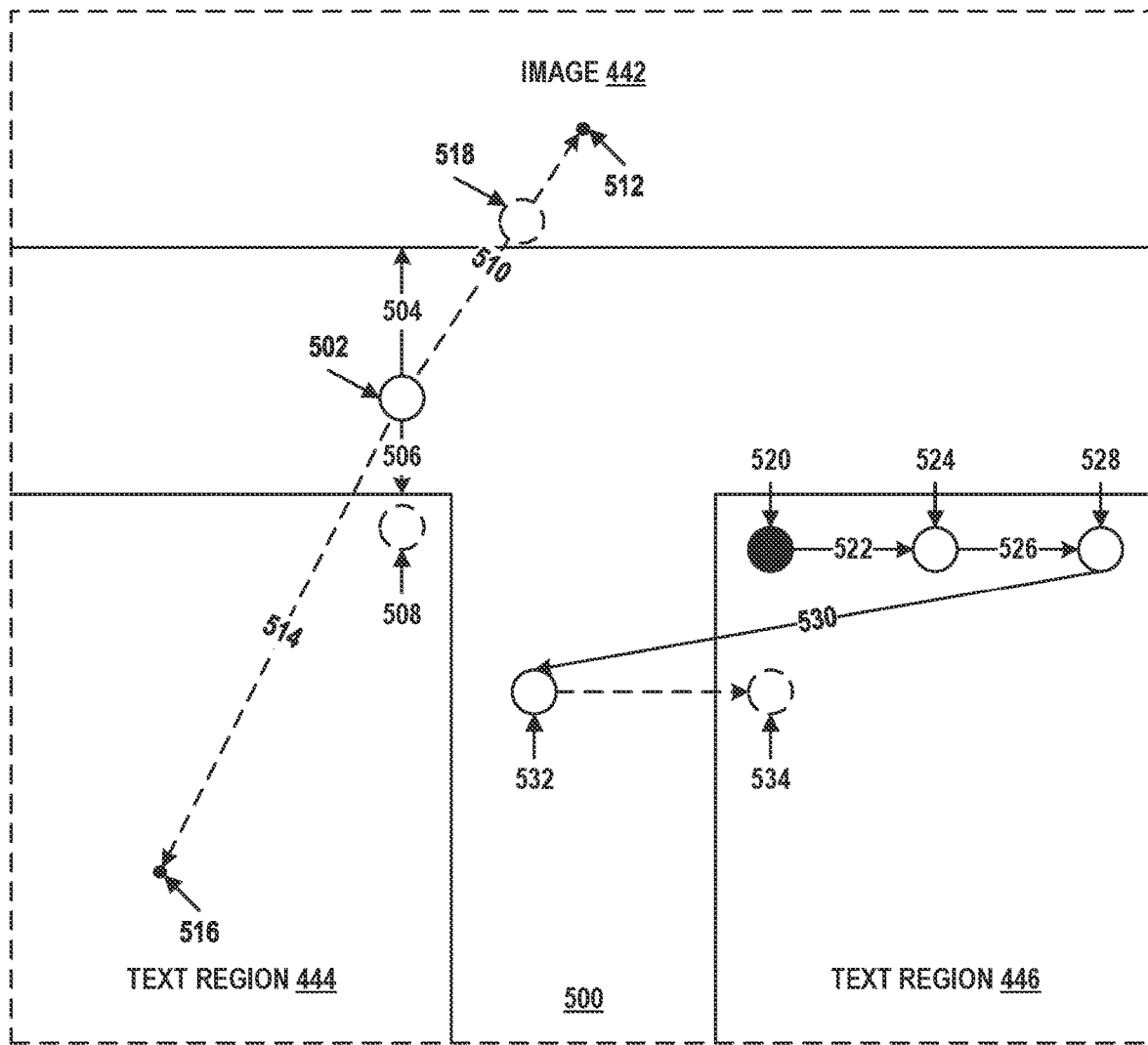
FIG. 5 illustrates eye gaze positions on a user interface, in accordance with examples described herein.

FIG. 5 illustrates example adjustments that may be made to eye gaze positions generated by LSTM model 300 based on semantic information associated with a subject at which a user's gaze is directed. Specifically, FIG. 5 illustrates region 500 of UI 430 shown in FIG. 4B, and includes parts of image 442, text region 444, and text region 446. The area of UI 430 may be annotated with semantic information that indicates, for each respective UI component therein, a type of the respective UI component. For example, the semantic annotations may take the form of and/or be similar to the labels shown in FIG. 4 for each UI component. Thus, for example, an area spanned by image 442 may be labeled to indicate that it contains an image, and an area spanned by text region 444 may be labeled to indicate that it contains text.

Accordingly, each UI component may be distinguishable from other UI components in UI 430, as well as from empty portions and/or background portions of UI 430. Thus, in some implementations, LSTM model 300 may include a semantic correction component configured to determine whether an output of adder 306 is consistent with the semantic content of UI 430. If the output of adder 306 is consistent with the semantic content, the output of adder 306 may constitute the predicted eye gaze position output by LSTM model 300. If the output of adder 306 is inconsistent with the semantic content, the semantic correction component may be configured to adjust the output of adder 306, and the output as adjusted may constitute the predicted eye gaze position output by LSTM model 300. The semantic correction component may include rules-based algorithms and/or heuristics, and/or a machine learning model that has been trained to perform the operations described herein.

In one example, adder 306 may generate UI coordinates 502 as its output. Since UI coordinates 502 correspond to an empty/background portion of UI 430, UI coordinates might be considered to be inconsistent with the semantic content of UI 430 because the user may be considered unlikely to look at empty/background regions of UIs. Accordingly, UI coordinates 502 may be adjusted by the semantic correction component to instead fall within a nearest and/or most likely non-empty/non-background UI component.

For example, the semantic correction component may be configured to determine that distance 506, representing a shortest straight-line distance between UI coordinates 502 and text region 444, is shorter than distance 504, representing a shortest straight-line distance between UI coordinates 502 and image 442. Based on this determination, UI coordinates 502 may be adjusted to UI coordinates 508 located within an area of text region 444. In another example, the semantic correction component may be configured to determine that distance 510, representing a straight-line between UI coordinates 502 and centroid 512 of image 442, is shorter than distance 514, representing a straight-line between UI coordinates 502 and centroid 516 of text region 444. Based on this determination, UI coordinates 502 may instead be adjusted to UI coordinates 518 located within an area of image 442.

The semantic correction component may additionally or alternatively be configured to consider a history of the predicted eye gaze positions in determining whether to adjust an output of adder 306. For example, adder 306 may generate UI coordinates 532 as its output. UI coordinates 532, reached as a result of incremental UI coordinates change 530, may be part of a sequence of UI coordinates 520, UI coordinates 524 reached as a result of incremental UI coordinates change 522, and UI coordinates 528 reached as a result of incremental UI coordinates change 526. Since UI coordinates 532 fall outside of text region 446, UI coordinates might be considered to be inconsistent with the semantic content of UI 430 because the user may be considered unlikely to skip from non-empty/non-background region of UIs to empty/background region of UIs.

Accordingly, UI coordinates 532 may be adjusted by the semantic correction component to instead continue to fall within the previously-observed non-empty/non-background UI component. Specifically, UI coordinates 532 may be adjusted to UI coordinates 534 located within an area of text region 446 at which the user was previously predicted to gaze. The adjustment from UI coordinates 532 to UI coordinates 534 may be performed notwithstanding the condition that UI coordinates 532 are closer to text region 444 than text region 446. Thus, in some cases, the history-based adjustment may be given priority over a distance-based adjustment. In other cases, the distance-based adjustment may be given priority over the history-based adjustment, or an adjustment may be performed based on both the distance and the history indicating the same adjustment.

In some implementations, the semantic correction component may be configured to be used after a predetermined number of predicted eye gaze positions have been generated following a corresponding warm-up phase of LSTM model 300. For example, following a given warm-up phase, LSTM model 300 may be used to generate a series of 50 predicted eye gaze positions before a subsequent warm-up phase is executed. The semantic correction component may be used to correct predicted eye gaze positions 30-50 in the series, but not predicted eye gaze positions 1-29 in the series, because the first 30 predictions in the series may be more accurate than the last 20 predictions in the series due to the autoregression. Accordingly, semantic corrections may allow LSTM model 300 to be used to determine a larger number of predicted eye gaze positions (e.g., 50 rather than 30) than would be possible without such semantic corrections.

In some implementations, a commensurate semantic map may be developed for various other contexts such as, for example, a robotic device or an automobile. The semantic map may be three-dimensional. For example, a semantic map of a robotic device may include, for each respective component of a plurality of components of the robotic device, an indication of whether the component is interactive and/or a likelihood of the user paying attention to the respective component. For example, a gripper and a head of the robot may be considered interactive and the user may be likely to pay attention to these components, while wheels or linkages of the robot may be considered non-interactive and/or unlikely to attract the user's attention. Thus, when the predicted eye gaze is in a region between a gripper and a linkage, the predicted eye gaze may be nudged toward the gripper, since it is the more interactive component.

In some implementations, LSTM model 300 may be configured to receive the semantic map as input and, based thereon, generate predicted eye gaze positions that are semantically consistent and thus do not necessitate further adjustments. That is, LSTM neural network layer 302 and/or fully-connected neural network layer 304 may be trained to perform the operations of the semantic correction component as part of generation of the intermediate output and/or the incremental change, respectively. Accordingly, training semantic maps may be provided at training time in order to train LSTM neural network layer 302 and/or fully-connected neural network layer 304 to explicitly generate semantic-aware incremental changes, rather than incremental changes that are subsequently adjusted based on a separate processing of the corresponding semantic map. For example, adjusted UI coordinates 508, 518, and/or 534 may be explicitly generated as the output of adder 306, and UI coordinates 502 and/or 532 might not be generated at all.

VI. EXAMPLE LSTM MODEL PERFORMANCE CHARACTERISTICS

Figure 6A:
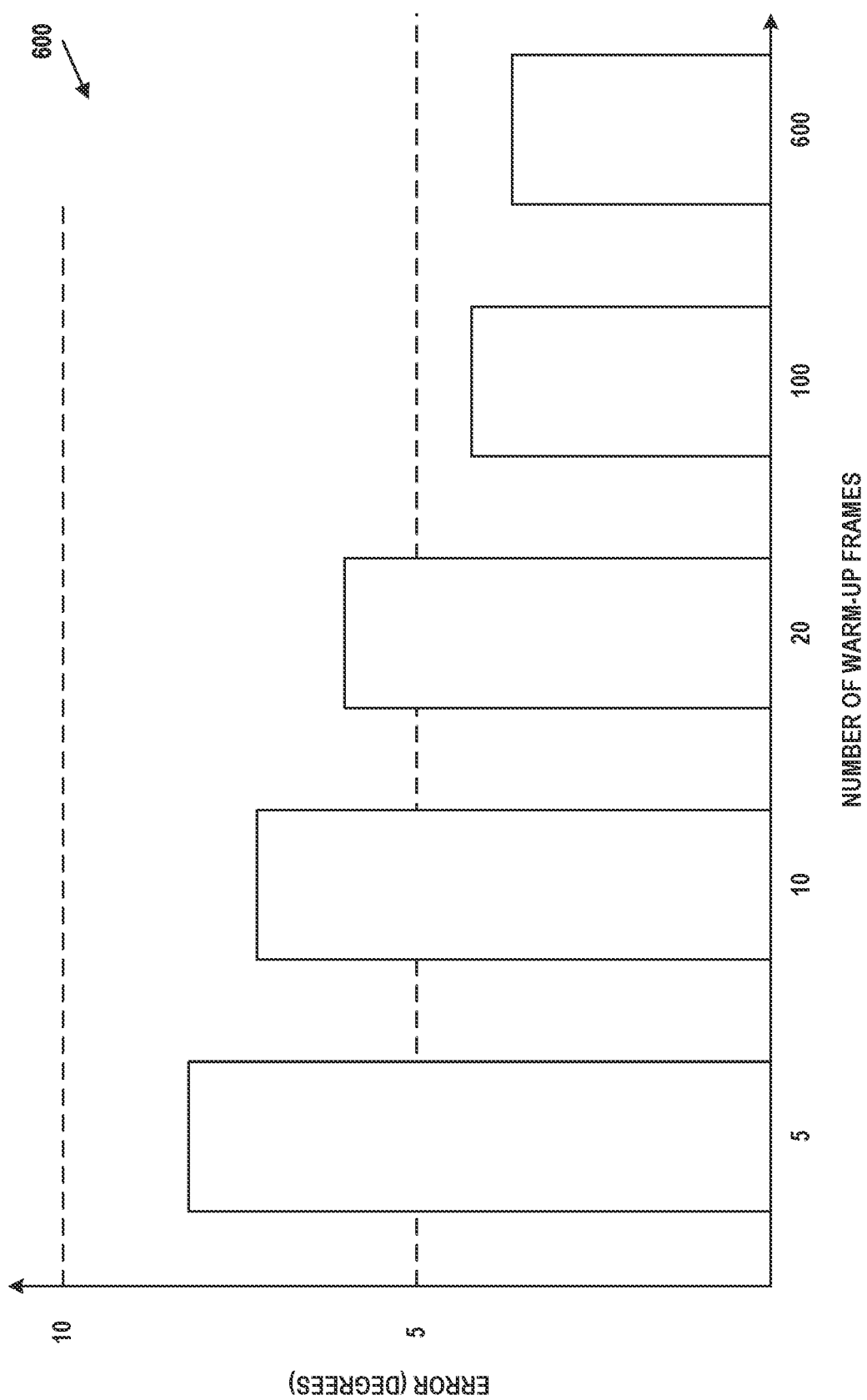
FIGS. 6A and 6B illustrate graphs of measured performance of an LSTM model in predicting eye gaze positions, in accordance with examples described herein.
Figure 6B:
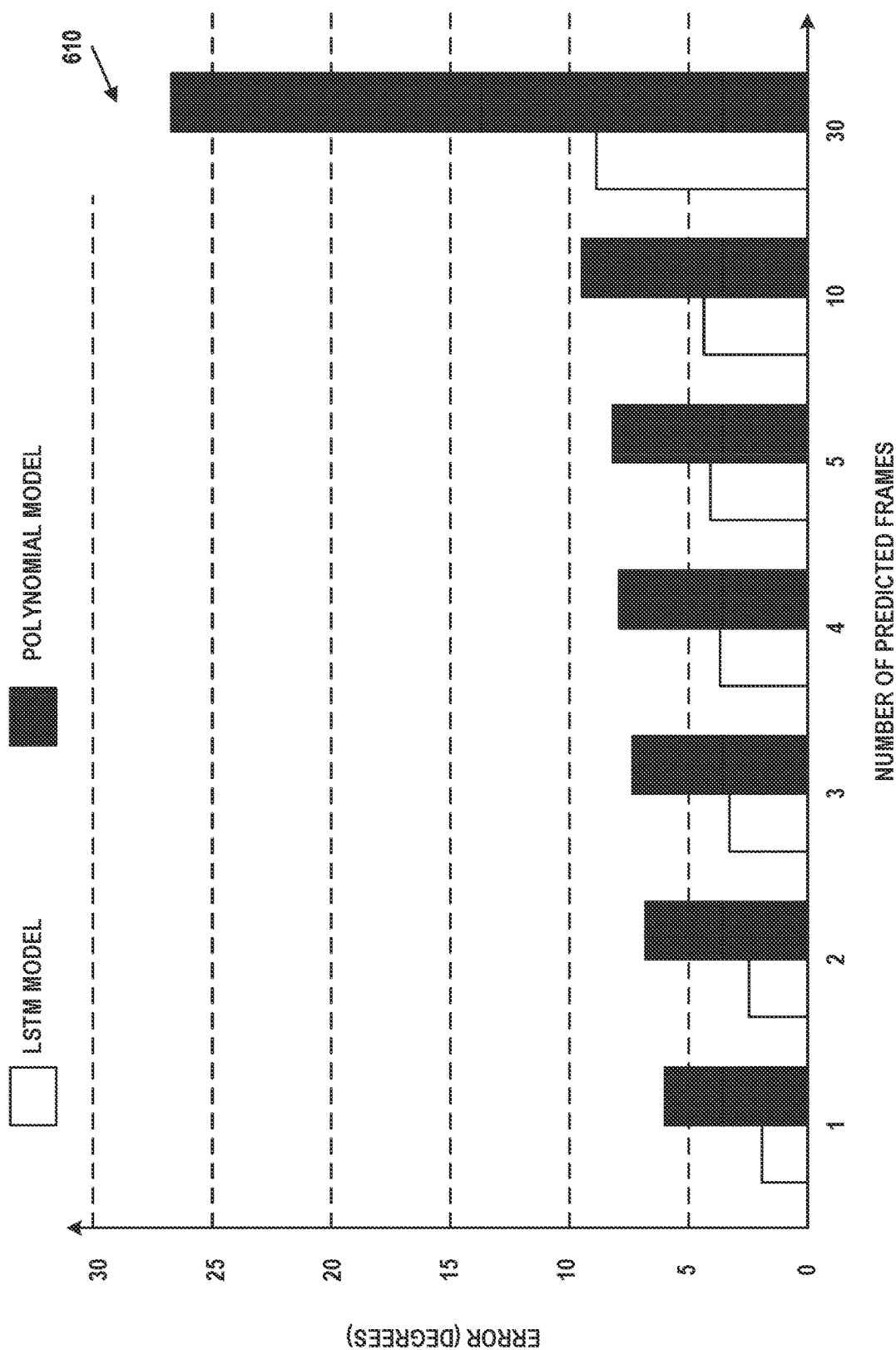

FIGS. 6A and 6B include graphs that characterize aspects of performance of LSTM model 300. Specifically, FIG. 6A includes graph 600 that shows an error, measured in degrees, of predicted eye gaze positions relative to actual eye gaze positions as a function of a number of warm-up frames (i.e., number of measured eye gaze positions 308-310) processed by LSTM model 300 prior to generating the predicted eye gaze positions. Graph 600 shows that 5 warm-up frames are associated with an error of approximately 8 degrees, 10 warm-up frames are associated with an error of approximately 7 degrees, 20 warm-up frames are associated with an error of approximately 6 degrees, 100 warm-up frames are associated with an error of approximately 4 degrees, and 10 warm-up frames are associated with an error of approximately 3.5 degrees.

Accordingly, based on graph 600, a number of measured eye gaze positions used as part of the warm-up phase of LSTM model 300 may be selected based on a threshold warm-up error that is tolerable in a given application. For example, when the threshold warm-up error is 10 degrees, indicating that errors below 10 degrees in the predicted eye gaze positions are acceptable, LSTM model 300 may be warmed-up with 5 measured eye gaze positions. When the threshold warm-up error is 5 degrees, indicating that errors below 5 degrees in the predicted eye gaze positions are acceptable, LSTM model 300 may be warmed-up with 100 measured eye gaze positions. In some implementations, graph 600 may be modified to include a denser sampling of the number of warm-up frames (e.g., from 5 to 600 in increments of 5), thus allowing the threshold warm-up error and the corresponding number of warm-up frames to be selected with greater granularity.

FIG. 6B includes graph 610 that shows an error, measured in degrees, of predicted eye gaze positions relative to actual eye gaze positions as a function of a number of predicted frames generated by LSTM model 300 after a given warm-up phase (without semantic-based corrections). Graph 610 includes white bars to show the performance of LSTM model 300, and black bars to show performance of a polynomial model that may be used as a reference. Graph 610 shows that, for LSTM model 300, the error after 1 predicted frame is approximately 2 degrees, the error after 2 predicted frames is approximately 2.5 degrees, the error after 3 predicted frames is approximately 3 degrees, the error after 4 predicted frames is approximately 3.5 degrees, the error after 5 predicted frames is approximately 4 degrees, the error after 10 predicted frames is approximately 4.5 degrees, and the error after 30 predicted frame is approximately 8.5 degrees.

Graph 610 also shows that, for the polynomial model, the error after 1 predicted frame is approximately 6 degrees, the error after 2 predicted frames is approximately 6.5 degrees, the error after 3 predicted frames is approximately 7 degrees, the error after 4 predicted frames is approximately 7.5 degrees, the error after 5 predicted frames is approximately 8 degrees, the error after 10 predicted frames is approximately 9.5 degrees, and the error after 30 predicted frame is approximately 27 degrees. Accordingly, LSTM model 300 significantly outperforms the polynomial model for all shown numbers of predicted frames, and especially so as the number of predicted frames rises above 10.

Accordingly, based on graph 610, a number of predicted eye gaze positions generated after each warm-up phase of LSTM model 300 may be selected based on a threshold autoregression error that is tolerable in a given application. For example, when the threshold autoregression error is 4 degrees, indicating that errors below 4 degrees in the predicted eye gaze positions are acceptable, LSTM model 300 may be used to generate up to 10 predicted eye gaze positions for each warm-up phase. When the threshold warm-up error is 10 degrees, indicating that errors below 10 degrees in the predicted eye gaze positions are acceptable, LSTM model 300 may be used to generate up to 30 eye gaze positions. In some implementations, graph 610 may be modified to include a denser sampling of the number of predicted frames (e.g., from 1 to 50 in increments of 1), thus allowing the threshold autoregression error and the corresponding number of predicted frames to be selected with greater granularity.

VII. EXAMPLE TRAINING OF LSTM MODEL

Figure 7:
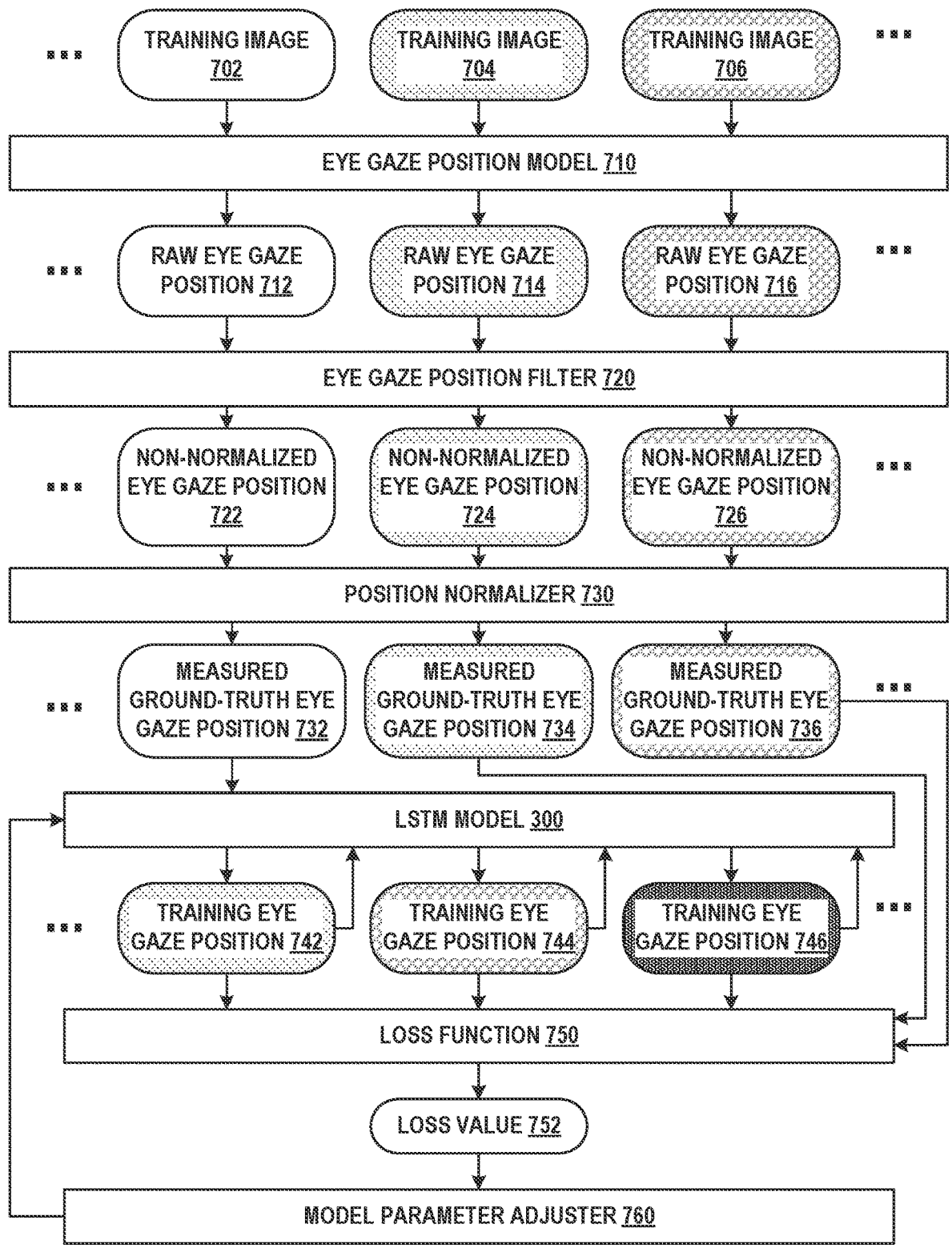
FIG. 7 illustrates aspects of training of an LSTM model for predicting eye gaze positions, in accordance with examples described herein.

FIG. 7 illustrates training system 700 that may be used to train LSTM model 300. Specifically, training system 700 includes eye gaze position model 710, eye gaze position filter 720, position normalizer 730, LSTM model 300, loss function 750, and model parameter adjuster 760. Training system 700 may be configured to generate a trained LSTM model 300 based on a plurality of training images, including training images 702, 704, and 706 (i.e., training images 702-706). Training images 702-706 may be temporally ordered, with each training image representing an eye of a user at a corresponding point in time. In particular, the eye of the user represented by training images 702-706 may be referred to as a training eye of a training user to differentiate the content of training images 702-706 from the content of images used at inference time (e.g., images used to determine measured eye gaze positions 308-310).

Eye gaze position model 710 may be configured to determine raw eye gaze positions 712, 714, and 716 (i.e., raw eye gaze positions 712-716) based on training images 702, 704, and 706, respectively, as indicated by corresponding fill patterns. Eye gaze position model 710 may be configured to, for each respective training image of training images 702-706, identify a plurality of landmark locations within the respective training image. For example, the plurality of landmark locations may include predetermined iris locations, predetermined eyelid locations, and/or predetermined facial locations surrounding the eye. The plurality of predetermined locations may be interconnected to form a mesh representing the training eye. Accordingly, the plurality of identified landmark locations may be indicative of deformations in regions of and around the training eye which provide cues as to the eye gaze position. Additionally, eye gaze position model 710 may be configured to determine a pose of the eye, which may be expressed as an eye pitch and an eye yaw (e.g., defined relative to a reference frame of the user's head). In some cases, the pose of the eye may be determined based on the plurality of landmark locations.

Eye gaze position model 710 may also be configured to determine and/or obtain one or more camera parameters associated with a camera used to capture training images 702-706. These camera parameters may include intrinsic camera parameters that define optical properties of the camera itself (e.g., focal point, principal point, etc.), as well as extrinsic camera parameters that, for each respective training image, define a pose of the camera reference frame relative to a world reference frame. The camera parameters may be determined using, for example, various camera localization algorithms based on the training images. Thus, the camera parameters may be used to transform the two-dimensional coordinates of one or more pixels from pixel space into three-dimensional coordinates in the camera reference frame and/or the world reference frame.

Accordingly, eye gaze position model 710 may be configured to transform the plurality of landmark locations and the pose of the eye into the camera reference frame and/or the world reference frame, thus representing aspects of the training eye in three-dimensions. Based on these three-dimensional representations of aspects of the training eye, eye gaze position model 710 may be configured to generate a vector representing the raw eye gaze position. For example, the vector may start at the center of an iris of the training eye and have a direction that corresponds to the pose of the eye. In implementations where eye gaze positions are represented in two dimensions (e.g., using UI coordinates), eye gaze position model 710 may also be configured to project the three-dimensional vector representations of the eye gaze position into a reference frame of, for example, the UI or another two-dimensional reference frame.

Raw eye gaze positions 712-716 may be considered "raw" in that they may be unfiltered, and thus represent blinks of the training eye. Accordingly, eye gaze position filter 720 may be configured to apply to raw eye gaze positions 712, 714, and 716 a filter configured to remove therefrom representations of blinks of the training eye, thus generating non-normalized eye gaze positions 722, 724, and 726, respectively, that do not represent the blinks. For example, eye gaze position filter 720 may comprise a median filter.

Non-normalized eye gaze positions 722, 724, and 726 may be considered non-normalized and in that they might not be scaled to the range of input values associated with and/or allowed for LSTM model 300. For example, when eye gaze positions are represented as vectors, these vectors may be non-normalized in that they may have non-unit length. In another example, when eye gaze positions are represented as UI coordinates, these UI coordinates may be considered non-normalized in that they may be represented in pixel space of a particular UI rather than scaled to a predetermined range (e.g., 0.0 to 1.0). Accordingly, position normalizer 730 may be configured to generate measured ground-truth eye gaze positions 732, 734, and 736 by normalizing non-normalized eye gaze positions 722, 724, and 726, respectively. Specifically, position normalizer 730 may scale non-normalized eye gaze positions to a range of input values that are associated with, allowed for, and/or configured to be processed by LSTM model 300.

In some implementations, the order of eye gaze position filter 720 and position normalizer 730 may be reversed, such that raw eye gaze positions 712-716 are normalized prior to being filtered. Further, eye gaze position model 710, eye gaze position filter 720, and/or position normalizer 730 may also be used at inference time in order to generate measured eye gaze positions that are used as part of the warm-up phase of LSTM model 300. For example, measured eye gaze positions 308-310 may be generated based on a processing of corresponding images of the eye of the user by eye gaze position model 710, eye gaze position filter 720, and/or position normalizer 730.

LSTM model 300 may be configured to generate training eye gaze positions 742, 744, and 746 based on measured ground-truth eye gaze position 732. Specifically, training eye gaze position 742 may be based directly on measured ground-truth eye gaze position 732, training eye gaze position 744 may be based on training eye gaze position 742, and training eye gaze position 746 may be based on training eye gaze position 744, with further training eye gaze positions (not shown) being similarly determined based on respective preceding training eye gaze positions. In some implementations, LSTM model 300 may also be configured to determine, as part of a warm-up phase, a plurality of other training eye gaze positions (not shown but indicated by the ellipses) preceding training eye gaze position 742 based on corresponding measured ground-truth eye gaze positions (not shown but indicated by the ellipses).

Loss function 750 may be configured to determine loss value 752 based on a comparison of training eye gaze positions generated by LSTM model 300 to corresponding measured ground-truth eye gaze positions. Specifically, measured ground-truth eye gaze positions 732, 734, and 736 may be associated with image frames n=99, n=100, and n=101, respectively. Training eye gaze positions 742, 744, and 746 may be associated with image frames n=100, n=101, and n=102, respectively. That is, training eye gaze position 742 (based on measured ground-truth eye gaze position 732 at image frame n=99) may represent a predicted eye gaze position at image frame n=100, while measured ground-truth eye gaze position 734 represents the actual eye gaze position at image frame n=100.

Accordingly, loss function 750 may be configured to determine a difference (e.g., normalized using the 1-2 norm) between training eye gaze position 742 and measured ground-truth eye gaze position 734 to quantify a prediction error of LSTM model 300 at image frame n=100 (this difference may be viewed as a first loss value). Similarly, loss function 750 may be configured to determine a difference (e.g., normalized using the 1-2 norm) between training eye gaze position 744 and measured ground-truth eye gaze position 736 to quantify a prediction error of LSTM model 300 at image frame n=101 (this difference may be viewed as a second loss value). Loss value 752 may represent a sum of the differences determined for, for example, image frames n=100 through n=199 in implementations where LSTM model 300 is configured to autoregress for 100 image frames.

Model parameter adjuster 760 may be configured to adjust one or more parameters of LSTM model 300 based on loss value 752. Specifically, model parameter adjuster 760 may be configured to adjust the one or more parameters so as to iteratively reduce loss value 752 to below a threshold loss value. For example, model parameter adjuster 760 may be configured to determine a gradient of loss function 750 at a point corresponding to loss value 752, and may use a gradient descent algorithm to iteratively update parameter values of LSTM model 300. Thus, with each training iteration, performance of LSTM model 300 may improve, and training may be stopped when loss value 752 falls below the threshold loss value for a given set of testing inputs.

In some implementations, the amount of time separating two consecutive predictions generated by LSTM model 300 may be based on the amount of time separating training images 702-706 from one another. For example, when training images 702-706 are separated by 10 milliseconds, LSTM model 300 may be configured to generate predicted eye gaze positions that are also separated by 10 milliseconds. Thus, 100 predictions generated by LSTM model 300 may span 1 second. Accordingly, in order to achieve a desired prediction rate (i.e., time interval between consecutive predicted eye gaze positions), some images may be removed from an image stream generated by a camera device in order to define training images 702-706. For example, every other image generated by the camera may be discarded, resulting in training images 702-706 having a frame rate that is half of the frame rate of the camera.

Additionally or alternatively, the amount of time separating two consecutive predictions generated by LSTM model 300 may be based on an amount of time separating measured eye gaze positions 308-310 from one another. For example, when consecutive measured eye gaze positions 308-310 are separated by 20 milliseconds, LSTM model 300 may be configured to generate predicted eye gaze positions that are also separated by 20 milliseconds. Accordingly, the amount of time separating two consecutive predictions generated by LSTM model 300 may be adjusted by changing the amount of time separating measured eye gaze positions 308-310 from one another. Thus, the warm-up phase may condition LSTM model 300 to generate predictions at the same frame rate as the measured eye gaze positions. In some cases, LSTM model 300 may be trained using a plurality of different sets of training images, where each set includes training images generated with a different corresponding frame rate, thereby configuring LSTM model 300 to handle varying prediction frame rates.

VIII. ADDITIONAL EXAMPLE OPERATIONS

Figure 8:
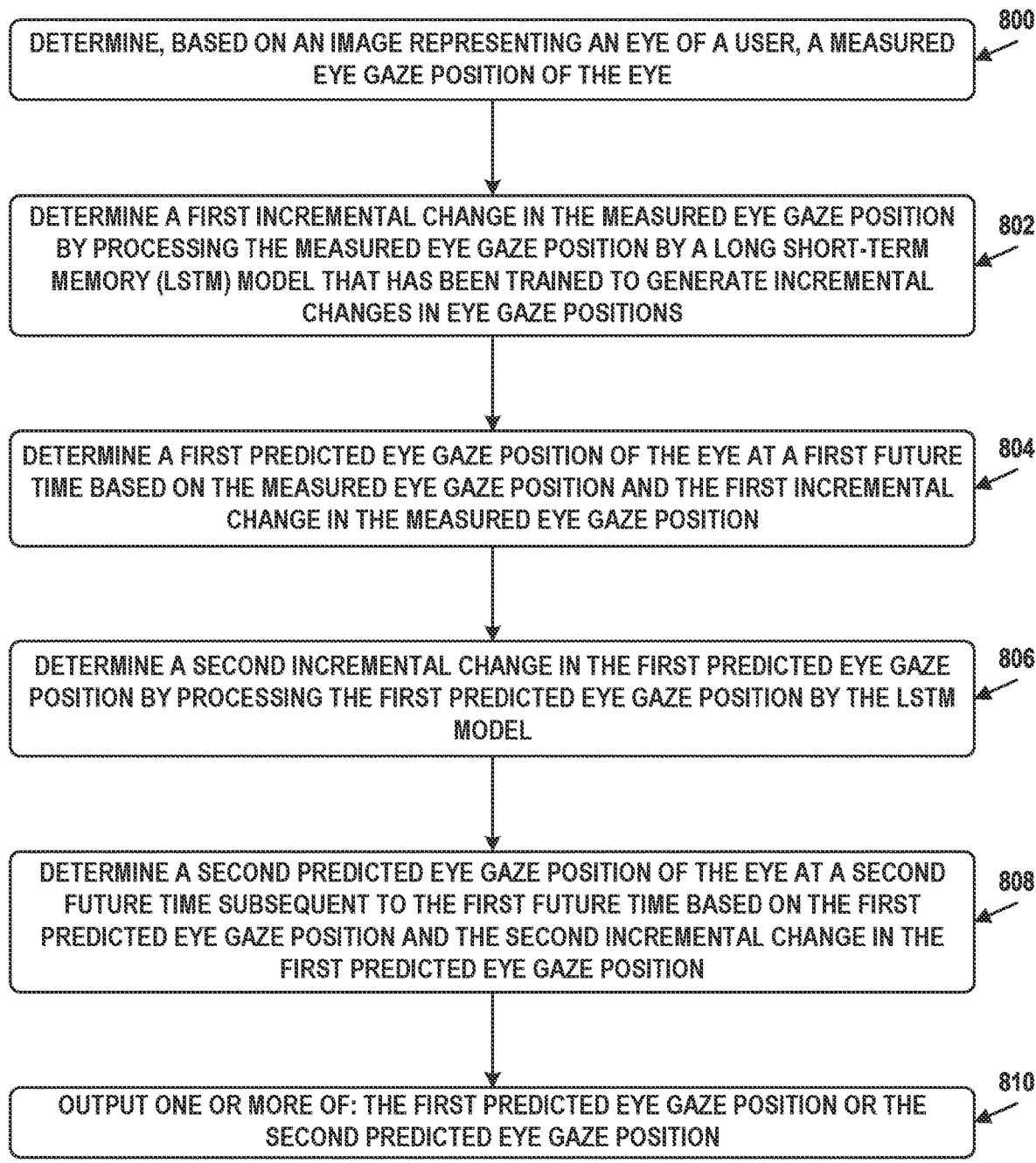
FIG. 8 is a flow chart, in accordance with examples described herein.

FIG. 8 illustrates a flow chart of operations related to determining predicted eye gaze positions. The operations may be carried out by computing device 100, computing system 200, LSTM model 300, and/or training system 700, among other possibilities. The embodiments of FIG. 8 may be simplified by the removal of any one or more of the features shown therein. Further, these embodiments may be combined with features, aspects, and/or implementations of any of the previous figures or otherwise described herein.

Block 800 may include determining, based on an image representing an eye of a user, a measured eye gaze position of the eye.

Block 802 may include determining a first incremental change in the measured eye gaze position by processing the measured eye gaze position by a long short-term memory (LSTM) model that has been trained to generate incremental changes in eye gaze positions.

Block 804 may include determining a first predicted eye gaze position of the eye at a first future time based on the measured eye gaze position and the first incremental change in the measured eye gaze position.

Block 806 may include determining a second incremental change in the first predicted eye gaze position by processing the first predicted eye gaze position by the LSTM model.

Block 808 may include determining a second predicted eye gaze position of the eye at a second future time subsequent to the first future time based on the first predicted eye gaze position and the second incremental change in the first predicted eye gaze position.

Block 810 may include outputting one or more of: the first predicted eye gaze position or the second predicted eye gaze position.

In some embodiments, the measured eye gaze position of the eye may be represented by a measured eye gaze vector that is normalized to have a predetermined length. Each respective incremental change in eye gaze position determined by the LSTM model may be represented as an incremental change vector. The LSTM model may have been trained to generate each respective incremental change vector such that, when the respective incremental change vector is added to a preceding eye gaze vector representing a preceding eye gaze position based on which the respective incremental change vector is determined by the LSTM model, the respective incremental change vector adjusts a direction of the preceding eye gaze vector while preserving the predetermined length of the preceding eye gaze vector.

In some embodiments, the measured eye gaze position of the eye may be represented by measured user interface (UI) coordinates within an area of a UI with which the user is interacting. Each respective incremental change in eye gaze position determined by the LSTM model may be represented as an incremental UI coordinates change. The LSTM model may have been trained to generate each respective incremental UI coordinates change such that, when the respective incremental UI coordinates change is added to preceding UI coordinates representing a preceding eye gaze position based on which the respective incremental UI coordinates change is determined by the LSTM model, the respective incremental UI coordinates change adjusts the preceding UI coordinates such that resulting predicted UI coordinates remain within the area of the UI.

In some embodiments, determining the measured eye gaze position of the eye may include determining a plurality of measured eye gaze positions corresponding to a plurality of sequential images each representing the eye of the user. Determining the first incremental change may include determining, for each respective measured eye gaze position of the plurality of measured eye gaze positions, a corresponding incremental change in the respective measured eye gaze position by processing the respective measured eye gaze position by the LSTM model. Processing the plurality of measured eye gaze positions by the LSTM model may update a hidden state of the LSTM model prior to generation of predicted eye gaze positions. The first incremental change may be based on a last measured eye gaze position of the plurality of measured eye gaze positions.

In some embodiments, updating the hidden state of the LSTM model prior to generation of predicted eye gaze positions may adapt and/or prime the LSTM to generate predicted eye gaze positions for a context associated with the plurality of measured eye gaze positions, such that a pattern of the predicted eye gaze positions generated by the LSTM corresponds to a pattern of the plurality of measured eye gaze positions.

In some embodiments, the plurality of measured eye gaze positions may include at least a threshold number of measured eye gaze positions configured to maintain a prediction error of the LSTM model under a threshold warm-up error.

In some embodiments, determining the second incremental change in the first predicted eye gaze position may include determining a plurality of incremental changes. Each respective incremental change of the plurality of incremental changes may be determined by processing a corresponding preceding predicted eye gaze position by the LSTM model and may represent a change relative to the corresponding preceding predicted eye gaze position. Determining the second predicted eye gaze position may include determining a plurality of predicted eye gaze positions. Each respective predicted eye gaze position of the plurality of predicted eye gaze positions may be associated with a corresponding future time and a corresponding incremental change of the plurality of incremental changes. Each respective predicted eye gaze position may be based on a sum of the corresponding incremental change and the corresponding preceding predicted eye gaze position.

In some embodiments, the plurality of predicted eye gaze positions may include up to a threshold number of predicted eye gaze positions configured to maintain a prediction error of the LSTM model under a threshold autoregression error.

In some embodiments, determining the first predicted eye gaze position may include determining first user interface (UI) coordinates based on the measured eye gaze position and the first incremental change, identifying a first UI component based on a distance between the first UI coordinates and the first UI component, and determining the first predicted eye gaze position based on one or more UI coordinates associated with the first UI component. Determining the second predicted eye gaze position may include determining second UI coordinates based on the first predicted eye gaze position and the second incremental change, identifying a second UI component based on a distance between the second UI coordinates and the second UI component, and determining the second predicted eye gaze position based on one or more UI coordinates associated with the second UI component.

In some embodiments, identifying the first UI component may include selecting the first UI component from a plurality of UI components that define a graphical user interface based on the first UI component being closest to the first UI coordinates. Identifying the second UI component may include selecting the second UI component from the plurality of UI components based on the second UI component being closest to the second UI coordinates.

In some embodiments, execution of a particular set of software instructions by a computing device may be triggered in response to the first predicted eye gaze position or the second predicted eye gaze position having a predetermined value. For example, the first predicted eye gaze position or the second predicted eye gaze position may provide user input to a user interface to control the computing device.

In some embodiments, triggering execution of the particular set of software instructions may include adjusting a content of a user interface (UI) provided by the computing device, or adjusting a layout of the UI provided by the computing device.

In some embodiments, each of (i) the first incremental change and (ii) the second incremental change may be determined based on processing, by the LSTM model, of a semantic map of a subject observed by the user.

In some embodiments, determining the measured eye gaze position may include determining one or more camera parameters associated with a camera used to capture the image, identifying a plurality of eye landmark locations within the image, determining a pose of the eye based on the image, and determining the measured eye gaze position based on the one or more camera parameters, the plurality of eye landmark locations, and the pose of the eye.

In some embodiments, the LSTM model may include an LSTM neural network layer configured to generate an intermediate output, and a fully connected neural network layer configured to generate the incremental changes in eye gaze positions based on the intermediate output.

In some embodiments, the LSTM model may have been trained using a training process that includes obtaining a plurality of sequential training images each representing a training eye of a training user, and determining, for each respective training image of the plurality of sequential training images, a measured ground-truth eye gaze position of the training eye of the training user. The training process may also include determining a first training incremental change in a first measured ground-truth eye gaze position by processing the first measured ground-truth eye gaze position by the LSTM model. The first measured ground-truth eye gaze position may correspond to a first training image captured at a first time. The training process may additionally include determining a first training eye gaze position of the training eye based on the first measured ground-truth eye gaze position and the first training incremental change in the measured eye gaze position. The first training eye gaze position may correspond to a second training image captured at a second time later than the first time. The training process may further include determining, using a loss function, a first loss value based on the first training eye gaze position and a second measured ground-truth eye gaze position corresponding to the second training image, and adjusting one or more parameters of the LSTM model based on the first loss value.

In some embodiments, the training process may yet additionally include determining a second training incremental change in the first training eye gaze position by processing the first training eye gaze position by the LSTM model, and determining a second training eye gaze position of the training eye based on the first training eye gaze position and the second training incremental change in the first training eye gaze position. The second training eye gaze position may correspond to a third training image captured at a third time later than the second time. The training process may yet further include determining, using the loss function, a second loss value based on the second training eye gaze position and a third measured ground-truth eye gaze position corresponding to the third training image, and adjusting the one or more parameters of the LSTM model based on the second loss value.

In some embodiments, determining the measured ground-truth eye gaze position for each respective training image may include determining, for each respective training image, a raw eye gaze position of the training eye of the training user. The raw eye gaze positions for the plurality of training images may represent blinks of the training eye. Determining the measured ground-truth eye gaze position for each respective training image may also include determining, for each respective training image, the measured ground-truth eye gaze position by applying a median filter to the raw eye gaze positions for the plurality of training images to remove representations of the blinks of the training eye.

In some embodiments, determining the measured ground-truth eye gaze position for each respective training image may include determining, for each respective training image, a non-normalized eye gaze vector representing the measured ground-truth eye gaze position for the respective training image, and determining, for each respective training image, a normalized eye gaze vector representing the measured ground-truth eye gaze position for the respective training image by normalizing to a predetermined length the non-normalized eye gaze vector for the respective training image.

In some embodiments, a time difference between the second future time and the first future time may be based on a frame rate associated with the plurality of sequential training images.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The invention claimed is:

1. A computer-implemented method comprising:
   determining, based on an image representing an eye of a user, a measured eye gaze position of the eye;
   determining a first incremental change in the measured eye gaze position by processing the measured eye gaze position by a long short-term memory (LSTM) model that has been trained to generate incremental changes in eye gaze positions;
   determining a first predicted eye gaze position of the eye at a first future time based on the measured eye gaze position and the first incremental change in the measured eye gaze position;
   determining a second incremental change in the first predicted eye gaze position by processing the first predicted eye gaze position by the LSTM model;
   determining a second predicted eye gaze position of the eye at a second future time subsequent to the first future time based on the first predicted eye gaze position and the second incremental change in the first predicted eye gaze position; and
   outputting one or more of: the first predicted eye gaze position or the second predicted eye gaze position.

2. The computer-implemented method of claim 1, wherein the LSTM model has been trained using a training process comprising:
   obtaining a plurality of sequential training images each representing a training eye of a training user;
   determining, for each respective training image of the plurality of sequential training images, a measured ground-truth eye gaze position of the training eye of the training user;
   determining a first training incremental change in a first measured ground-truth eye gaze position by processing the first measured ground-truth eye gaze position by the LSTM model, wherein the first measured ground-truth eye gaze position corresponds to a first training image captured at a first time;
   determining a first training eye gaze position of the training eye based on the first measured ground-truth eye gaze position and the first training incremental change in the measured eye gaze position, wherein the first training eye gaze position corresponds to a second training image captured at a second time later than the first time;
   determining, using a loss function, a first loss value based on the first training eye gaze position and a second measured ground-truth eye gaze position corresponding to the second training image; and
   adjusting one or more parameters of the LSTM model based on the first loss value.

3. The computer-implemented method of claim 2, wherein the training process further comprises:
   determining a second training incremental change in the first training eye gaze position by processing the first training eye gaze position by the LSTM model;
   determining a second training eye gaze position of the training eye based on the first training eye gaze position and the second training incremental change in the first training eye gaze position, wherein the second training eye gaze position corresponds to a third training image captured at a third time later than the second time;
   determining, using the loss function, a second loss value based on the second training eye gaze position and a third measured ground-truth eye gaze position corresponding to the third training image; and
   adjusting the one or more parameters of the LSTM model based on the second loss value.

4. The computer-implemented method of claim 2, wherein determining the measured ground-truth eye gaze position for each respective training image comprises:
   determining, for each respective training image, a raw eye gaze position of the training eye of the training user, wherein the raw eye gaze positions for the plurality of sequential training images represent blinks of the training eye; and
   determining, for each respective training image, the measured ground-truth eye gaze position by applying a median filter to the raw eye gaze positions for the plurality of sequential training images to remove representations of the blinks of the training eye.

5. The computer-implemented method of claim 2, wherein determining the measured ground-truth eye gaze position for each respective training image comprises:
- determining, for each respective training image, a non-normalized eye gaze vector representing the measured ground-truth eye gaze position for the respective training image; and
- determining, for each respective training image, a normalized eye gaze vector representing the measured ground-truth eye gaze position for the respective training image by normalizing to a predetermined length the non-normalized eye gaze vector for the respective training image.

6. The computer-implemented method of claim 2, wherein a time difference between the second future time and the first future time is based on a frame rate associated with the plurality of sequential training images.

7. The computer-implemented method of claim 1, wherein:
- determining the measured eye gaze position of the eye comprises determining a plurality of measured eye gaze positions corresponding to a plurality of sequential images each representing the eye of the user;
- determining the first incremental change comprises determining, for each respective measured eye gaze position of the plurality of measured eye gaze positions, a corresponding incremental change in the respective measured eye gaze position by processing the respective measured eye gaze position by the LSTM model;
- processing the plurality of measured eye gaze positions by the LSTM model updates a hidden state of the LSTM model prior to generation of predicted eye gaze positions; and
- the first incremental change is based on a last measured eye gaze position of the plurality of measured eye gaze positions.

8. The computer-implemented method of claim 7, wherein the plurality of measured eye gaze positions comprises at least a threshold number of measured eye gaze positions configured to maintain a prediction error of the LSTM model under a threshold warm-up error.

9. The computer-implemented method of claim 1, wherein:
- determining the second incremental change in the first predicted eye gaze position comprises determining a plurality of incremental changes;
- each respective incremental change of the plurality of incremental changes is determined by processing a corresponding preceding predicted eye gaze position by the LSTM model and represents a change relative to the corresponding preceding predicted eye gaze position;
- determining the second predicted eye gaze position comprises determining a plurality of predicted eye gaze positions;
- each respective predicted eye gaze position of the plurality of predicted eye gaze positions is associated with a corresponding future time and a corresponding incremental change of the plurality of incremental changes; and
- each respective predicted eye gaze position is based on a sum of the corresponding incremental change and the corresponding preceding predicted eye gaze position.

10. The computer-implemented method of claim 9, wherein the plurality of predicted eye gaze positions comprises up to a threshold number of predicted eye gaze positions configured to maintain a prediction error of the LSTM model under a threshold autoregression error.

11. The computer-implemented method of claim 1, wherein:
- determining the first predicted eye gaze position comprises:
  - determining first user interface (UI) coordinates based on the measured eye gaze position and the first incremental change;
  - identifying a first UI component based on a distance between the first UI coordinates and the first UI component; and
  - determining the first predicted eye gaze position based on one or more UI coordinates associated with the first UI component; and
- determining the second predicted eye gaze position comprises:
  - determining second UI coordinates based on the first predicted eye gaze position and the second incremental change;
  - identifying a second UI component based on a distance between the second UI coordinates and the second UI component; and
  - determining the second predicted eye gaze position based on one or more UI coordinates associated with the second UI component.

12. The computer-implemented method of claim 11, wherein:
- identifying the first UI component comprises selecting the first UI component from a plurality of UI components that define a graphical user interface based on the first UI component being closest to the first UI coordinates; and
- identifying the second UI component comprises selecting the second UI component from the plurality of UI components based on the second UI component being closest to the second UI coordinates.

13. The computer-implemented method of claim 1, wherein the measured eye gaze position of the eye is represented by a measured eye gaze vector that is normalized to have a predetermined length, wherein each respective incremental change in eye gaze position determined by the LSTM model is represented as an incremental change vector, wherein the LSTM model has been trained to generate each respective incremental change vector such that, when the respective incremental change vector is added to a preceding eye gaze vector representing a preceding eye gaze position based on which the respective incremental change vector is determined by the LSTM model, the respective incremental change vector adjusts a direction of the preceding eye gaze vector while preserving the predetermined length of the preceding eye gaze vector.

14. The computer-implemented method of claim 1, wherein the measured eye gaze position of the eye is represented by measured user interface (UI) coordinates within an area of a UI with which the user is interacting, wherein each respective incremental change in eye gaze position determined by the LSTM model is represented as an incremental UI coordinates change, wherein the LSTM model has been trained to generate each respective incremental UI coordinates change such that, when the respective incremental UI coordinates change is added to preceding UI coordinates representing a preceding eye gaze position based on which the respective incremental UI coordinates change is determined by the LSTM model, the respective incremental UI coordinates change adjusts the preceding UI coordinates such that resulting predicted UI coordinates remain within the area of the UI.

15. The computer-implemented method of claim 1, further comprising:
triggering execution of a particular set of software instructions by a computing device in response to the first predicted eye gaze position or the second predicted eye gaze position having a predetermined value.

16. The computer-implemented method of claim 1, wherein each of (i) the first incremental change and (ii) the second incremental change is determined based on processing, by the LSTM model, of a semantic map of a subject observed by the user.

17. The computer-implemented method of claim 1, wherein determining the measured eye gaze position comprises:
determining one or more camera parameters associated with a camera used to capture the image;
identifying a plurality of eye landmark locations within the image;
determining a pose of the eye based on the image; and
determining the measured eye gaze position based on the one or more camera parameters, the plurality of eye landmark locations, and the pose of the eye.

18. The computer-implemented method of claim 1, wherein the LSTM model comprises:
an LSTM neural network layer configured to generate an intermediate output; and
a fully connected neural network layer configured to generate the incremental changes in eye gaze positions based on the intermediate output.

19. A system comprising:
a processor; and
a non-transitory computer-readable medium having stored thereon instructions that, when executed by the processor, cause the processor to perform operations comprising:
determining, based on an image representing an eye of a user, a measured eye gaze position of the eye;
determining a first incremental change in the measured eye gaze position by processing the measured eye gaze position by a long short-term memory (LSTM) model that has been trained to generate incremental changes in eye gaze positions;
determining a first predicted eye gaze position of the eye at a first future time based on the measured eye gaze position and the first incremental change in the measured eye gaze position;
determining a second incremental change in the first predicted eye gaze position by processing the first predicted eye gaze position by the LSTM model;
determining a second predicted eye gaze position of the eye at a second future time subsequent to the first future time based on the first predicted eye gaze position and the second incremental change in the first predicted eye gaze position; and
outputting one or more of: the first predicted eye gaze position or the second predicted eye gaze position.

20. A non-transitory computer-readable medium having stored thereon instructions that, when executed by a computing device, cause the computing device to perform operations comprising:
determining, based on an image representing an eye of a user, a measured eye gaze position of the eye;
determining a first incremental change in the measured eye gaze position by processing the measured eye gaze position by a long short-term memory (LSTM) model that has been trained to generate incremental changes in eye gaze positions;
determining a first predicted eye gaze position of the eye at a first future time based on the measured eye gaze position and the first incremental change in the measured eye gaze position;
determining a second incremental change in the first predicted eye gaze position by processing the first predicted eye gaze position by the LSTM model;
determining a second predicted eye gaze position of the eye at a second future time subsequent to the first future time based on the first predicted eye gaze position and the second incremental change in the first predicted eye gaze position; and
outputting one or more of: the first predicted eye gaze position or the second predicted eye gaze position.

* * * * *